United States Patent
Jewell et al.

(10) Patent No.: US 9,911,066 B2
(45) Date of Patent: Mar. 6, 2018

(54) CLASSIFICATION SYSTEM FOR SIMILAR OBJECTS FROM DIGITAL IMAGES

(71) Applicants: Zoe Jewell, Durham, NC (US); Sky Alibhai, Durham, NC (US)

(72) Inventors: Zoe Jewell, Durham, NC (US); Sky Alibhai, Durham, NC (US)

(*) Notice: Subject to any disclaimer, the term of this patent is extended or adjusted under 35 U.S.C. 154(b) by 0 days.

(21) Appl. No.: 15/100,713

(22) PCT Filed: Dec. 1, 2014

(86) PCT No.: PCT/US2014/067973
§ 371 (c)(1),
(2) Date: Jun. 1, 2016

(87) PCT Pub. No.: WO2015/081343
PCT Pub. Date: Jun. 4, 2015

(65) Prior Publication Data
US 2016/0300123 A1 Oct. 13, 2016

Related U.S. Application Data

(60) Provisional application No. 61/910,400, filed on Dec. 1, 2013.

(51) Int. Cl.
*G06K 9/62* (2006.01)
*G06F 3/0484* (2013.01)
*G06K 9/46* (2006.01)

(52) U.S. Cl.
CPC ....... *G06K 9/6218* (2013.01); *G06F 3/04842* (2013.01); *G06K 9/4604* (2013.01); *G06K 9/6227* (2013.01)

(58) Field of Classification Search
CPC ...... G06K 9/46; G06K 9/6227; G06K 9/4604; G06K 9/6218; G06F 3/04842;
(Continued)

(56) References Cited

U.S. PATENT DOCUMENTS 9,171,217 B2 * 10/2015 Pawlicki .................. G06T 7/13
2013/0235213 A1 * 9/2013 Kennedy ................. G06T 7/00
348/187
(Continued)

OTHER PUBLICATIONS

Jewell et al., "Censusing and monitoring black rhino (*Diceros bicornis*) using an objective spoor (footprint) identification technique", J. Zool., London 254; Publication [online] 2001 {retrieved Jan. 25, 2015} Retrieved from the Internet: <URL: http://wildtrack.org/wp-content/uploads/2013/05/SPOOR-ID.pdf>; p. 1-16.
(Continued)

*Primary Examiner* — Ali Bayat
(74) *Attorney, Agent, or Firm* — Troutman Sanders LLP; Ryan A. Schneider; Andrew C. Doherty

(57) ABSTRACT

Aspects of the present disclosure may include a method of classifying an object that includes, receiving a set of images of an indication of an object, extracting data from the images, performing a comparison of the extracted image data to a set of comparison data associated with a set of comparative objects, determining a classification of the object based on the comparison and outputting data representative of the classification. The method may classify an object by an individual identity or by one or more group characteristics.

19 Claims, 33 Drawing Sheets

(58) Field of Classification Search
CPC ....... G06F 9/4443; A61B 5/08; A61B 5/1075; G06T 7/0014
See application file for complete search history.

(56) References Cited

U.S. PATENT DOCUMENTS

| | | | | |
|---|---|---|---|---|
| 2013/0332213 | A1* | 12/2013 | Heggen | G06Q 10/06313 705/7.15 |
| 2014/0168204 | A1* | 6/2014 | Zhang | G06T 13/20 345/419 |
| 2014/0201126 | A1* | 7/2014 | Zadeh | G06K 9/627 706/52 |
| 2016/0062152 | A1* | 3/2016 | Fonte | G06Q 30/0621 351/204 |

OTHER PUBLICATIONS

Alibhai, et al., "A footprint technique to identify white rhino Ceratotherium simum at individual and species levels" Endangered Species Research, vol. 4:205-218, 2008; Publication [online] Jan. 2007 {retrieved Jan. 25, 2015} Retrieved from Internet: <URL: http://www.researchgate.net/publication/230877175_A_footprint_technique_to_identify_white_rhino_Ceratotherium_simum_at_individual_and_species_levels/file/9fcfd505a663b5c997.pdf>; pp. 205-218.

Jewell et al. "Identifying endangered species from footprints"; SPIE Newsroom, Publication [online] Jan. 4, 2013 {retrieved Jan. 25, 2015} Retrieved from the Internet: <URL: http://spie.org/x91627_xml>; pp. 1-3.

The International Search Report and Written Opinion for the priority PCT Application No. PCT/US2014/067973, dated Mar. 16, 2015.

* cited by examiner

FIG. 8L

CLASSIFICATION SYSTEM FOR SIMILAR OBJECTS FROM DIGITAL IMAGES

CROSS-REFERENCE TO RELATED APPLICATIONS

This application is a U.S. National Stage of International Application No. PCT/US2014/067973, filed 1 Dec. 2014, which claims the benefit of U.S. Provisional Patent Application No. 61/910,400, filed 1Dec. 2013, each herein fully incorporated by reference.

BACKGROUND

Wildlife research often necessitates methods for estimating the size of unknown wild animal populations and for tracking individual animals within those populations. These two goals may generally be referred to as "censusing" and "monitoring," respectively.

Traditional methods of censusing and monitoring often involve invasive and costly approaches such as radio-telemetry (e.g., fitting a tracking device to an animal) or marking (e.g., ear-notching). These methods generally involve either direct physical handling of the animals or otherwise disturbing the animals in their natural habitat. Evidence suggests that such methods may have harmful effects on endangered species, including decreased fertility, reduced body weight, and ranging behavior. Furthermore, capturing an animal through physical or chemical immobilization may cause the animal stress, pain, fear, anxiety, physical injury, or even death.

Endangered species often are particularly desirable to census and monitor as they tend to have low or declining populations, and it is desirable to protect them in order to preserve biodiversity. It is therefore desirable to have a method of censusing and monitoring endangered species in a manner that is unobtrusive and harmless to the animals that are the subject of observation. Close observation from ground or aerial vehicles may allow observation of species without directly handling the animals. But, these methods are expensive and are still likely to involve creating an unnatural disturbance in the habitat of the animals that may negatively impact the animals. Furthermore, individual animals may not be easily identified and distinguished from others by mere observation alone.

Every species of animal has a unique foot anatomy, and each individual animal within a species has unique footprints. Accordingly, species of animals may be identified by examining a set of footprints or tracks ("tracking"). Tracking has long been a method used in hunting and wildlife research to locate a particular species of animal. While it is both cheap and unobtrusive, tracking is a difficult skill learned over time that cannot be readily imparted to wildlife researchers. Further, even experienced trackers may not be able to readily determine the individual identification, age-class, or sex of an animal within the species from merely observing tracks. Furthermore, to the extent a tracker may attempt to associate a set of tracks with an individual animal, the identification may be inherently unreliable as it requires the use of the tracker's memory for comparison to other sets of tracks. As such, digital photography may provide a suitable aid in advancing the use of animal tracks for identification purposes.

SUMMARY

New methods and techniques are necessary for identifying and tracking animal species in the wild in an affordable, sustainable, unobtrusive manner that is harmless to the animals. Furthermore, these new methods and techniques may enable indigenous communities who familiar with the animals and their tracks, to more easily participate in the process of data collection for conservation monitoring. Some or all of the deficiencies of the traditional methods of animal identification and tracking described above may be addressed by certain embodiments of the disclosed technology. For example, certain embodiments may include capturing digital images in accordance with a standardized protocol, extracting data from the images, applying statistical processes to the data to classify the animal (such classification may include, but not be limited to, for example, species, individual identification, age-class, or sex), and mapping the spatial and temporal distributions of the animals. It should be understood that while this disclosure generally describes the identification of animals, the methods and techniques described herein may be applied to any number of different objects in other fields, such as, but not limited to, medical images, law-enforcement/homeland-security images, or images from other scientific fields such as geology or botany.

According to an example embodiment, a method is provided. The method may comprise receiving a set of images of an indication of an object, extracting image data from each image comprising the set of images of the indication of the object, comparing the image data to a set of comparison data, wherein the set of comparison data comprises a plurality of data sets, wherein each of the plurality of data sets is associated with a comparative object, determining a classification of the object based on the comparison, and outputting, for display, output data representative of the determined classification of the object.

According to another example embodiment, extracting image data may comprise providing a plurality of landmark points on an image of the set of images of the indication of the object, providing a plurality of derived points on the image, generating object data, wherein object data comprises at least one of an area, an angle or a distance between landmark points and/or derived points, and outputting the object data.

According to another example embodiment, extracting image data may further comprise adjusting the resolution and orientation of the image to substantially match the resolution and orientation of a sample object image.

According to another example embodiment, the sample object image may comprise a number of sample landmark points, and wherein each landmark point provided on the image corresponds to a corresponding sample landmark point on the sample object image.

According to another example embodiment, a position of each derived point may be determined by the positions of a number of landmark points.

According to another example embodiment, extracting image data may further comprise providing two scale points on the image, positioned with respect to a measuring reference depicted in the image such that the positions of the two scale points correspond to a reference distance of the measuring reference.

According to another example embodiment, comparing the image data set to a set of comparison data may comprise, generating, through discriminant analysis of the image data and the set of comparison data, an image set of canonical variates corresponding to the image data, a plurality of comparison sets of canonical variates, wherein each of the plurality of comparison sets of canonical variates corresponds to a comparative object, and an RCV set of canonical variates corresponding to a cumulative set of image data and comparison data, generating a first centroid value corresponding to the image set of canonical variates, a plurality of comparison centroid values, wherein each of the plurality of comparison centroid values corresponds to a comparison set of canonical variates of the plurality of comparison sets of canonical variates, and an RCV centroid value corresponding to the RCV set of canonical variates, plotting, in two-dimensional space, the first set of canonical variates as a first canonical centroid plot represented by a first ellipse having a center point at the first centroid value, one of the plurality of comparison sets of canonical variates as a second canonical centroid plot represented by a second ellipse having a center point at one of the plurality of comparison centroid values, and the RCV set of canonical variates as an RCV canonical centroid plot, represented by a third ellipse having a center point at the RCV centroid value, and determining whether the first ellipse overlaps the second ellipse.

According to another example embodiment, determining a classification of the object may comprise classifying the object as having the same individual identity as a comparative object in response to determining that the first ellipse overlaps the second ellipse.

According to another example embodiment, the output data representative of the determined classification of the object may comprise an indication that the object has the same individual identity as the comparative object.

According to another example embodiment, comparing the image data set to a set of comparison data may further comprise, determining a plurality of distance values wherein a distance value comprises the distance between the first centroid value and a comparison centroid value of the plurality of comparison centroid values, the first centroid value and the RCV centroid value, a comparison centroid value of the plurality of comparison centroid values and the RCV value, or a first comparison centroid value of the plurality of comparison centroid values and a second comparison centroid value of the plurality of comparison centroid values, applying a clustering technique to the plurality of distance values, and generating, responsive to applying the clustering technique, a cluster dendrogram.

According to another example embodiment, the clustering technique may comprise Ward's clustering technique.

According to another example embodiment, the output data representative of the determined classification of the object may comprise a cluster dendrogram.

According to another example embodiment, comparing the image data set to a set of comparison data may comprise, performing a validated discriminant analysis of the image data, comprising, identifying a plurality of sets of known object data, wherein each of the plurality of sets of known object data comprises one of the plurality of sets of data which comprise the comparison data, receiving a selection of variables, responsive to receiving the selection of variables, generating, through discriminant analysis, a canonical plot of the image data and the plurality of sets of known object data, wherein the image data is located at a location in the canonical plot, identifying a region of the canonical plot that corresponds to a group criterion classification, and determining the group criterion classification of the object based on the location of the extracted data in the canonical plot relative to the identified region.

According to another example embodiment, receiving a selection of variables may comprise, designating the plurality of sets of known object data as a Y variables in a validated discriminant analysis, receiving a selection of a group criterion as an X variable in a validated discriminant analysis, and receiving a selection of other validated discriminant analysis variables.

According to another example embodiment, other validated discriminant analysis variables may comprise at least one of validation type, number of folds, and stepwise selection.

According to another example embodiment, the group criterion may comprise one of sex, age-class or species.

According to another example embodiment, the output data representative of the determined classification of the object may comprise an indication of the group criterion classification of the object.

According to another example embodiment, a method of classifying an object may comprise, receiving a set of images of an indication of the object, extracting image data from each image comprising the set of images of the indication of the object, comparing the image data to a set of comparison data, wherein the set of comparison data comprises a plurality of data sets, wherein each of the plurality of data sets is associated with a comparative object, wherein comparing the image data to a set of comparison data comprises, generating, through discriminant analysis of the image data and the set of comparison data, an image set of canonical variates corresponding to the image data, a plurality of comparison sets of canonical variates, wherein each of the plurality of comparison sets of canonical variates corresponds to a comparative object, and an RCV set of canonical variates corresponding to a cumulative set of image data and comparison data, generating a first centroid value corresponding to the image set of canonical variates, a plurality of comparison centroid values, wherein each of the plurality of comparison centroid values corresponds to a comparison set of canonical variates of the plurality of comparison sets of canonical variates, and an RCV centroid value corresponding to the RCV set of canonical variates, plotting, in two-dimensional space, the first set of canonical variates as a first canonical centroid plot represented by a first ellipse having a center point at the first centroid value, one of the plurality of comparison sets of canonical variates as a second canonical centroid plot represented by a second ellipse having a center point at one of the plurality of comparison centroid values, and the RCV set of canonical variates as an RCV canonical centroid plot, represented by a third ellipse having a center point at the RCV centroid value, determining whether the first ellipse overlaps the second ellipse, determining a classification of the object based on the comparison, and outputting, for display, output data representative of the determined classification of the object.

According to another example embodiment, comparing the image data set to a set of comparison data may further comprise, determining a plurality of distance values wherein a distance value comprises the distance between the first centroid value and a comparison centroid value of the plurality of comparison centroid values, the first centroid value and the RCV centroid value, a comparison centroid value of the plurality of comparison centroid values and the RCV value, or a first comparison centroid value of the plurality of comparison centroid values and a second comparison centroid value of the plurality of comparison centroid values, applying a clustering technique to the plurality of distance values, and generating, responsive to applying the clustering technique, a cluster dendrogram.

According to another example embodiment, the output data representative of the determined classification of the object may comprise a cluster dendrogram.

According to another example embodiment, a computer program product is provided. The computer program product may include a computer-readable medium. The computer-readable medium may store instructions that, when executed by at least one processor of a system, causes the system to perform a method. The method may include any of the methods described herein.

According to another example embodiment, a system is provided. The system may include at least one memory operatively coupled to at least one processor and configured for storing data and instructions. The data and instructions, when executed by at least one processor, may cause the system to execute any of the methods described herein.

Other embodiments, features, and aspects of the disclosed technology are described in detail herein and are considered a part of the claimed disclosed technology. Other embodiments, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein:

FIG. 8L depicts an example UI 800 of the object classification system, according to an example embodiment.

DETAILED DESCRIPTION

Figure 1:
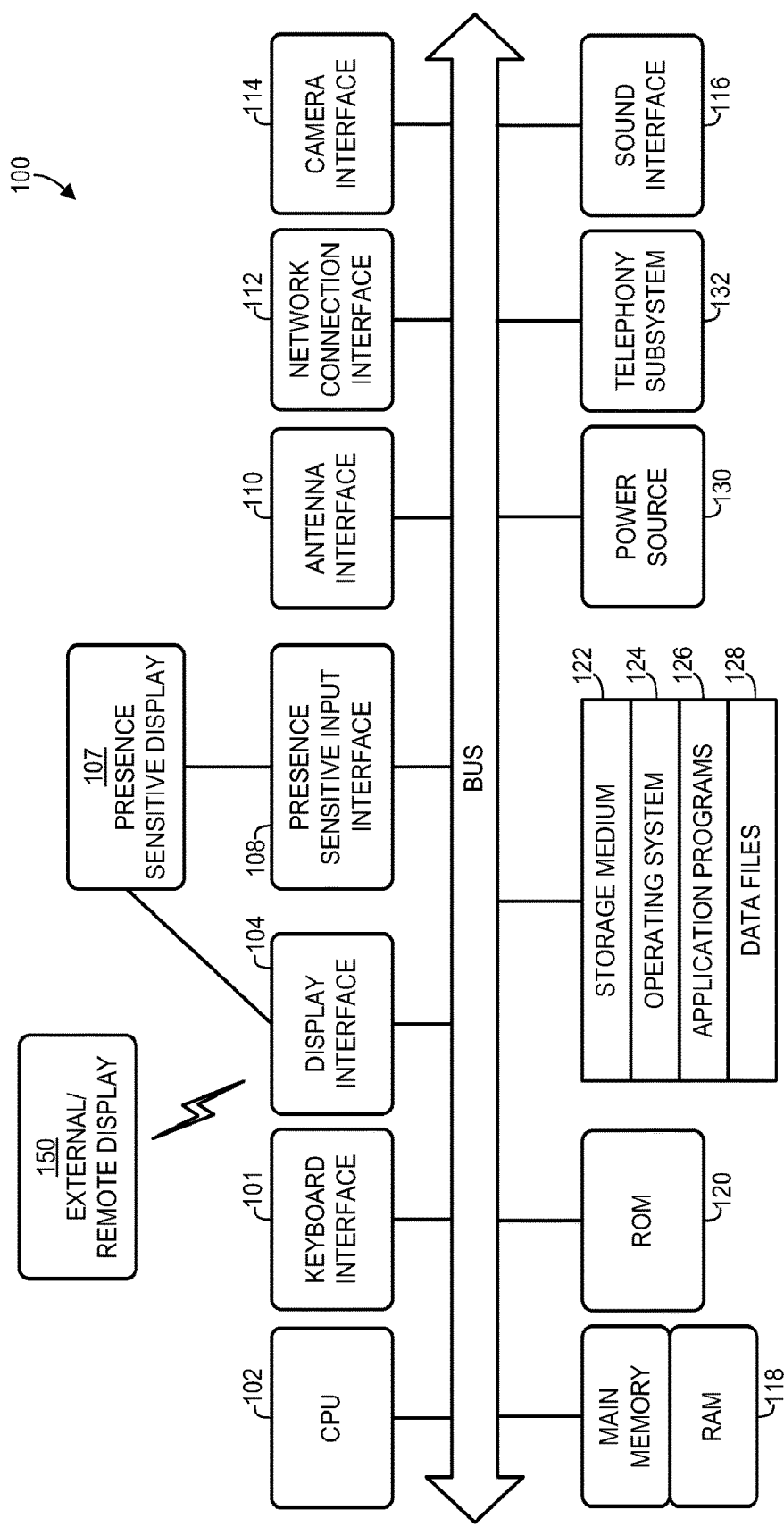
FIG. 1 depicts a block diagram of illustrative computing device architecture 100, according to an example embodiment.

Embodiments of the disclosed technology include systems, methods, and computer-readable mediums for classifying an unknown object by analyzing a set of digital images of the object and performing statistical analysis on data extracted from, or data characterizing elements of, the images in view of a set of data previously collected on objects of a similar type (including the same or similar species). The statistical analysis may include performing pair-wise analysis of similar groups of objects, images, or data, and creating a cluster dendrogram of the groups, to provide an individual classification of an object. The analysis may also include performing a validated discriminant analysis on the data relating to the known and unknown objects to provide a classification of a group criterion of an object, such as sex, age-class or species. In some embodiments, the objects may be animals or animal tracks.

Throughout this disclosure, certain embodiments are described in exemplary fashion in relation to classifying and identifying a particular animal based on a series of footprints or tracks. But, embodiments of the disclosed technology are not so limited. In some embodiments, the disclosed technique may be effective in classifying and identifying any number of objects in a variety of settings and industries. For example, other objects that may be classified by the system may include but not be limited to, objects represented by medical images, biometric images, law-enforcement/homeland-security images, or images from other scientific fields such as geology or botany.

Some embodiments of the disclosed technology will be described more fully hereinafter with reference to the accompanying drawings. This disclosed technology may, however, be embodied in many different forms and should not be construed as limited to the embodiments set forth therein.

In the following description, numerous specific details are set forth. But, it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described Must be in a given sequence, either temporally, spatially, in ranking, or in any other manner.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Various systems, methods, and computer-readable mediums are disclosed for classifying and identifying objects from a series of digital images, and will now be described with reference to the accompanying figures.

FIG. 1 depicts a block diagram of illustrative computing device architecture 100, according to an exemplary embodiment. Certain aspects of FIG. 1 may be embodied in a computing device 100. As desired, embodiments of the disclosed technology may include a computing device with more or less of the components illustrated in FIG. 1. It will be understood by those of skill in the art that the computing device architecture 100 is provided for example purposes only and does not limit the scope of the various embodiments of the presently disclosed systems, methods, and computer-readable mediums.

The computing device architecture 100 of FIG. 1 includes a CPU 102, where computer instructions are processed; a display interface 104 that acts as a communication interface and provides functions for rendering video, graphics, images, and texts on the display. In certain embodiments of the disclosed technology, the display interface 104 may be directly connected to a local display, such as a touch-screen display associated with a mobile computing device. In another exemplary embodiment, the display interface 104 may be configured for providing data, images, and other information for an external/remote display that is not necessarily physically connected to the mobile computing device. For example, a desktop monitor may be utilized for mirroring graphics and other information that is presented on a mobile computing device. In certain some embodiments, the display interface 104 may wirelessly communicate, for example, via a Wi-Fi channel or other available network connection interface 112 to the external/remote display.

In an exemplary embodiment, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture 100 may include a keyboard interface 106 that provides a communication interface to a keyboard. In one example embodiment, the computing device architecture 100 may include a presence-sensitive display interface 107 for connecting to a presence-sensitive display. According to certain some embodiments of the disclosed technology, the presence-sensitive display interface 107 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 106, the display interface 104, the presence sensitive display interface 107, network connection interface 112, camera interface 114, sound interface 116, etc.) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example embodiments of the computing device architecture 100 may include an antenna interface 110 that provides a communication interface to an antenna; a network connection interface 112 that provides a communication interface to a network. In certain embodiments, a camera interface 114 is provided that acts as a communication interface and provides functions for capturing digital images from a camera. In certain embodiments, a sound interface 116 is provided as a communication interface for converting sound into electrical signals using a microphone and for converting electrical signals into sound using a speaker. According to example embodiments, a random access memory (RAM) 118 is provided, where computer instructions and data may be stored in a volatile memory device for processing by the CPU 102.

According to an example embodiment, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example embodiment, the computing device architecture 100 includes a storage medium 122 or other suitable type of memory (e.g., RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example embodiment, the computing device architecture 100 includes a power source 130 that provides an appropriate alternating current (AC) or direct current (DC) to power components. According to an example embodiment, the computing device architecture 100 includes a telephony subsystem 132 that allows the device 100 to transmit and receive sound over a telephone network. The constituent devices and the CPU 102 communicate with each other over a bus 134.

According to an example embodiment, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 125 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example embodiment, the term computing device, as used herein, may be a CPU, or conceptualized as a CPU (for example, the CPU 102 of FIG. 1). In this example embodiment, the computing device may be coupled, connected, and/or in communication with one or more peripheral devices, such as display. In another example embodiment, the term computing device, as used herein, may refer to a mobile computing device, such as a smartphone or tablet computer. In this example embodiment, the computing device may output content to its local display and/or speaker(s). In another example embodiment, the computing device may output content to an external display device (e.g., over Wi-Fi) such as a TV or an external computing system.

In some embodiments of the disclosed technology, the computing device may include any number of hardware and/or software applications that are executed to facilitate any of the operations. In some embodiments, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various embodiments of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Aspects of the present disclosure may be implemented using a computing device similar to computing device 100 and including more or less components or features than are shown in FIG. 1.

As described herein, embodiments of the disclosed technology may include techniques for classifying an unknown object, such as an animal, or a representation or indication of an animal, for example, animal footprints or tracks, from one or more digital images. While much of this disclosure is described with respect to classifying unknown objects that are animals, it should be understood by those with skill in the art that the methods disclosed herein may also be applied to known objects and objects other than animals. In an example embodiment, a first stage may comprise obtaining digital images of an object that is sought to be classified. The digital images may be obtained in accordance with a standardized protocol. For example, if the object sought to be classified is a tiger, a device such as a digital camera may capture a series of digital images of tiger footprints (i.e., tracks) from a substantially continuous line of tracks (i.e., a particular trail). A second stage may comprise extracting image data from digital images into the object classification system where the data can be manipulated for future analysis. A third stage may comprise processing the image data using statistical processes in a customized algorithm. The statistical processes may include a discriminant analysis to generate one or more sets of canonical variates from which canonical centroid plots allow a pair-wise comparison using a model of overlap:non-overlap as the classifier. In one embodiment, the statistical processes may further include use of a clustering technique to take the distances generated and output a cluster dendrogram to identify objects at a specified observation level. One example of a clustering technique that may be used is Ward's clustering technique. A fourth stage may comprise mapping temporal and spatial dynamics of the images or objects. For example, images or objects may be mapped based on GPS and/or timestamp data associated with the images.

An object classification system may operate in part by performing a pair-wise comparison of groups. Generally speaking, pair-wise analysis seeks to determine whether two groups being compared come from one set (or individual) or two sets (or individuals). For example, a pair-wise comparison of two sets of tiger tracks may attempt to determine whether the two groups of tiger tracks come from the same tiger (i.e., they come from one set), or two different tigers (i.e., they come from two sets). Through repetition of pair-wise comparisons between pairs of groups being compared, it may be possible to determine the number of sets (or individuals, e.g., tigers) in the analyzed groups. For example, if ten sets of tiger tracks are compared in this manner, it may be determined that there are six individual tigers that account for the ten sets of tracks. Although much of this disclosure is described with respect to identifying animals based on footprints or tracks, those of skill in the art will appreciate that this analysis may be applied to any number of object types or species and the groups to be analyzed may be generated from the same individual (e.g., footprints), or the groups may comprise different individuals (e.g., a group of seeds of the same variety).

Figure 2:
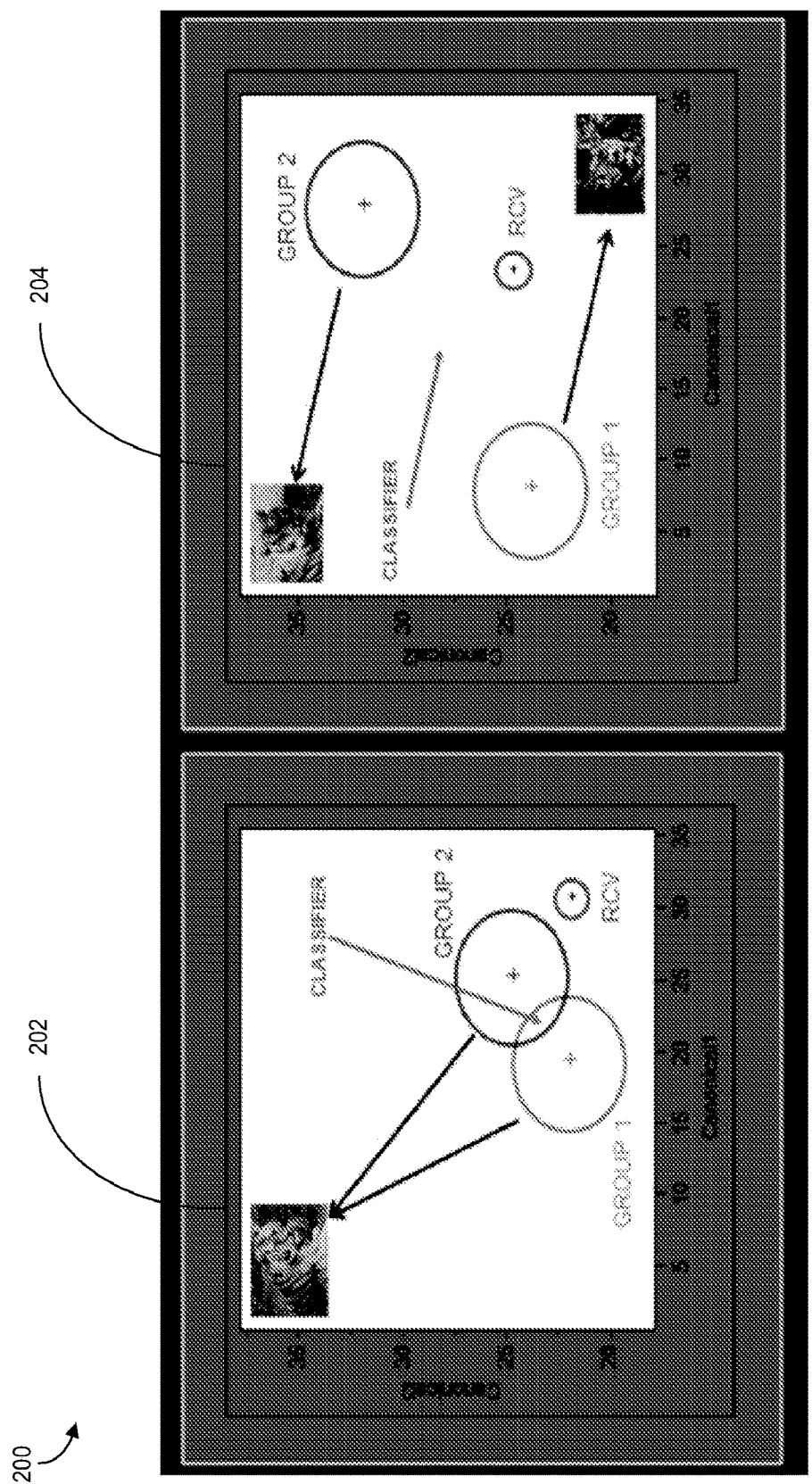
FIG. 2 depicts an exemplary representation of a pair-wise analysis 200.

In one embodiment, the system may utilize linear discriminant analysis to generate a series of canonical variates. Generally, a canonical variate may be a new variable (variate) formed by making a linear combination of two or more variates (variables) form a data set, wherein a linear combination of variables may be the same as a weighted sum of variables. For each data set, discriminant analysis may produce a set of canonical variates that described the variation in the data. For example, in one instance, a first canonical variate may describe 70% of the variation, a first and second canonical variate may collectively describe 90% of the data, and adding a third canonical variate may describe 99% of the data. Each data set may produce several canonical variates. In generating a series of canonical variates, the system may incorporate the use of a statistical software package, such as JMP. According to one embodiment, a first canonical variate may be generated from a set of data relating to an unknown object, and the remaining canonical variates may be generated from a set of data relating to known objects, such that each canonical variate represents one data set. In some embodiments, the canonical variates may be represented as circles or ellipses in two-dimensional space. According to one embodiment, the center of the circles or ellipses may represent the centroid value of a data set, and the diameter of the circle may be proportional to a specified confidence interval. The system may then compare one canonical variate to another to determine if each data set represents the same object, or different objects. FIG. 2 depicts visual representations of a first exemplary embodiment of a pair-wise comparison 202 and a second exemplary embodiment of a pair-wise comparison 204. In an example embodiment, an object classification system may generate an overlap of the two confidence interval ellipses (labeled in FIG. 2 as "GROUP 1" and "GROUP 2"), which may indicate the objects can be classified as the same object as shown in 202. Alternatively, if there is no overlap of the two confidence interval ellipses, it may indicate that the objects should be classified as different objects, as shown in 204. Thus, as shown in FIG. 2, the objects in 202 may be classified as being the same object because their ellipses overlap, whereas the objects in 204 may be classified as being different objects because their ellipses do not overlap.

In one embodiment, a reference centroid value (RCV) data set may be used as a third component within the canonical analysis, and the RCV data set may be depicted as a smaller ellipse, as shown in FIG. 2. The RCV may generally comprise the entire data set of all groups combined. For example, once the system establishes an initial database (i.e., data extracted from a training set of known objects) for an object-type or species, the whole data set of measurements for all the variables can be duplicated in the same database and relabeled as the RCV, according to one embodiment. In one embodiment, the data may be stored in a data table. From that point forward, in one embodiment, the system may incorporate the RCV data set into the analysis when running a cycle of the object classification model for comparing two groups. As will be appreciated, incorporating the RCV into the analysis has the effect of providing stability and consistency to the pair-wise comparisons executed by the object classification system. The RCV may provide stability by acting as a constant from which the relative distance between the centroid values of the ellipses of the objects being compared in a pair-wise comparison may be measured.

As discussed, since objects or species often have unique geometrical features, it is desirable to generate a customized object classification algorithm for each object or species to ensure greater accuracy of classification. Such customized algorithms may be generated by a recursive or iterative process performing various steps of the stages described above on images of known objects (a "training set"), and by subsequently adjusting certain variables until a desired level of accuracy in the classification results of the training set is achieved. Such factors may include, but are not limited to, the number of images per object (e.g., the number of footprints per trail), the level of confidence interval, the RCV constant, and the number of image variables used. According to one embodiment, once the customized algorithm can properly classify the images of the training set (i.e., the known images) at the desired level of accuracy, the object classification system may then be used to classify images of unknown objects. For example, in the case of footprint identification, it has been found through experimentation that generally between six and eight footprints per group (trail) produces a high accuracy of classification.

Variables may impact the algorithm by influencing the size and location of the ellipses representing the canonical variates of each group or data set. For example, the number of variables (i.e., data points) selected to represent each group (e.g., trail) to be identified may have a strong influence on whether two groups of a pair-wise analysis overlap or not. Generally, as the number of variables in each group decreases, the diameter of the canonical ellipse increases and the distance between the centroid values decreases. As the number of variables in each group increases, the diameter of the canonical ellipse decreases, and the distance between the centroid values increases. Accordingly, the number of variables per group may be adjusted to capture a preferred algorithm, which may be the most accurate algorithm.

Image variables may be data points and other measurements taken from each object image. For example, one image variable may be the distance between two landmark points placed on an image. In an example embodiment, the statistical software incorporated as part of the object classification system may have a feature that allows for stepwise selection of image variables based on their F-ratios. F-ratios indicate how much a variable contributes to the difference between groups. For any given pair-wise group comparison, their canonical ellipses move farther apart when the number of variables used is increased, and move closer when the number of variables is decreased. The optimal number of variables giving the highest level of accuracy may be determined by establishing a database of measurements from known groups or individuals.

Typically, the confidence interval (contour probability) of a group may determine the diameter of its ellipse. As the confidence interval decreases, the ellipse diameter increases. As the confidence interval increases, the ellipse diameter decreases. The optimal value of the confidence interval giving the highest level of accuracy can be determined by establishing a database of measurements from known groups or individuals.

Processes

As described above, embodiments of the disclosed technology include methods for classifying an unknown object, such as an animal, from one or more digital images. In various embodiments an object classification system may identify the type or species of an unknown object. In various embodiments, the object classification system may identify a unique identity of an object, relative to other similar objects of a set (e.g., it may identify a particular tiger as unique from a set of known tigers). In various embodiments, the object classification system may classify group characteristics (group criterion) of an unknown object, such as sex or age-class. In some embodiments of an object classification algorithm initialization process 300 as shown in FIG. 3, the object classification system may utilize a set of data of known objects to generate an algorithm to be used in classifying unknown objects.

Figure 4:
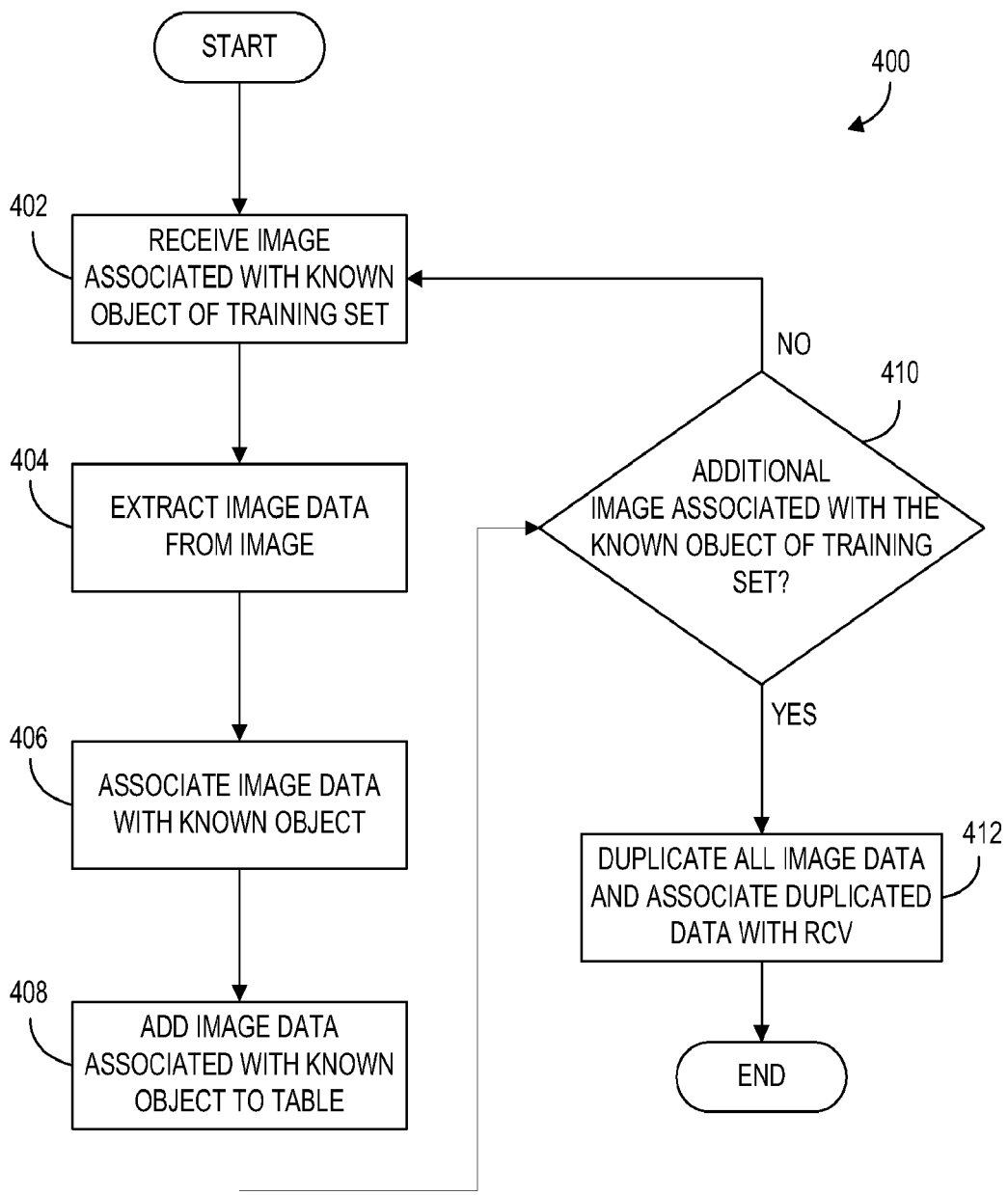
FIG. 4 depicts a flow chart of an example known-object data table generation process 400, according to an example embodiment.

In one embodiment, algorithm initialization process 300 begins with a known-object data table generation process 400. According to one embodiment, a known-object data table generation process 400 may comprise generating a table of data relating to images of known objects. In one embodiment, an object classification algorithm of the system is initialized using data from a set of images of known objects of the same type of object as the unknown object sought to be classified. In one embodiment, this set of images may be referred to as "the training set." FIG. 4 shows an embodiment of the known-object table generation process 400, which will be described further below. In one embodiment, after generating a data table of known-object data through the known-object data table generation process 400, the object classification system may generate an object classification algorithm, at 302. For example, the object classification system may generate an unknown-object classification algorithm comprising a set of variables, including but not limited to, the number and identity of initial measurements (i.e., variables) from a set of images, the contour probability of the canonical ellipses, and the RCV, specified to generate an effective classification when used in conjunction with a pair-wise analysis of known-object image data. Data extracted from images may be stored in a data table, in response to receiving selections of one or more input variables. The input variables may include, for example, but not be limited to, an "X variable," which may comprise the type of model being used (for example, model designed for classifying cheetahs), "Y variables," which may comprise data sets extracted or measured from object images (e.g., footprint measurements), a validation input, which may comprise a selection of data sets to compare (e.g., a selection of trails on which to perform the pair-wise analysis), the number of variables, the RCV, and/or the contour probability. As noted, the number of variables used may determine the distance between the centroid values of the two ellipses when compared.

In one embodiment, at 304, after generating the object classification algorithm, the system may present to a user the option to evaluate whether the results generated by the algorithm based on the training set objects (i.e., the known objects) have achieved the desired accuracy of classification. For example, if the training set consists of 20 sets of tracks produced by 15 different known tigers, the results of the object classification algorithm ideally should reflect the existence of 15 different tigers based on the 20 sets of tracks. It may also be desirable for the algorithm to accurately identify other attributes of the 15 identified tigers. For example, in one embodiment, the object classification system may identify the sex of each tiger and the age-class of each tiger, by separately performing a validated discriminant analysis. In one embodiment, if the user determines the algorithm does not reflect the desired level of accuracy, then the object classification system may receive adjustments to the input variables (e.g., X, Y, and validation inputs) at 206, and repeat the process of generating an object classification algorithm with the adjusted variables as shown in FIG. 3. Alternatively, responsive to receiving an indication that the results of the algorithm reflect the known attributes of the training set to a desired level of accuracy, the algorithm initialization process 300 may end.

Figure 3:
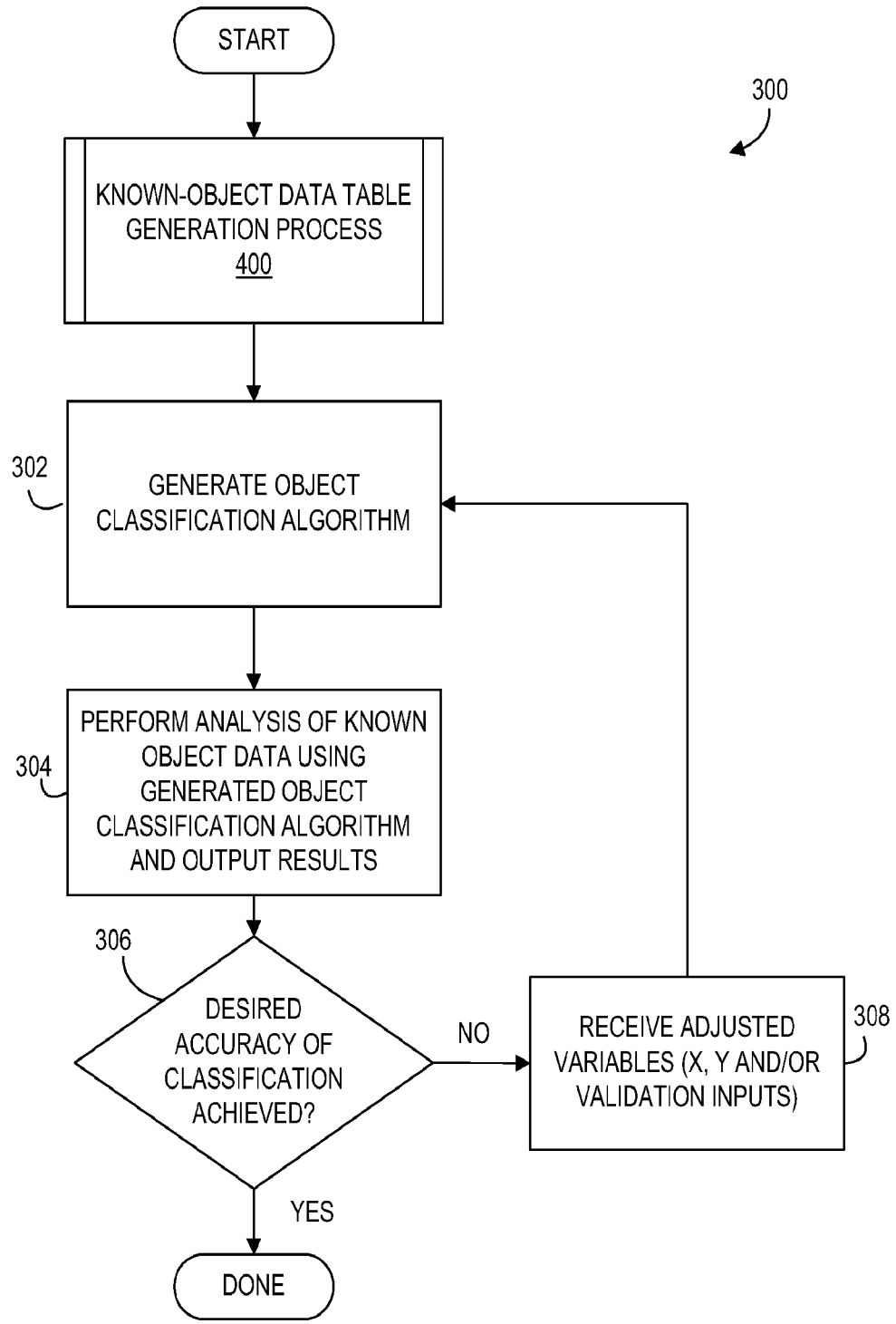
FIG. 3 depicts a flow chart of an example algorithm initialization process 300, according to an example embodiment.

As described above, in various embodiments, the algorithm initialization process 300 of FIG. 3 may be used to initialize an object classification algorithm that the system may use to identify and classify unknown objects of the same type. FIG. 4 shows an embodiment of known-object data table generation process 400 that may be used to generate a table of data relating to a training set. In one embodiment, the known-object data table generation process begins at 402, wherein the system receives an image associated with the training set. At 404, the system may extract image data from the image, according to one embodiment. Image data may include, for example, the locations of various landmark points located on the image, the locations of various derived points located on the image, and the distances, angles or areas between various landmark and/or derived points. According to one embodiment, the system may associate the extracted image data with the known object. For example, the system may associate known attributes such as the unique identity of the object, the sex of the object, or the age-class of the object, with the extracted data. At 408, the system may add image data to a data table, in accordance with one embodiment. Responsive to receiving an indication that there is another image associated with the known object of the training set that has not yet been processed and added to the data table, the known-object data table generation process may proceed from 410 to 402 and receive the next image. In various embodiments, this process may be repeated until the system receives all images of all known-objects of the training set, extracts their image data, and adds the data to the data table. In one embodiment, once the system adds all image data of the training set to the data table, prior to ending, known-object data table generation process 400 may proceed to 412 where the system may duplicate all of the image data in the data table and associate the duplicated copy of image data with the RCV data set.

Figure 5:
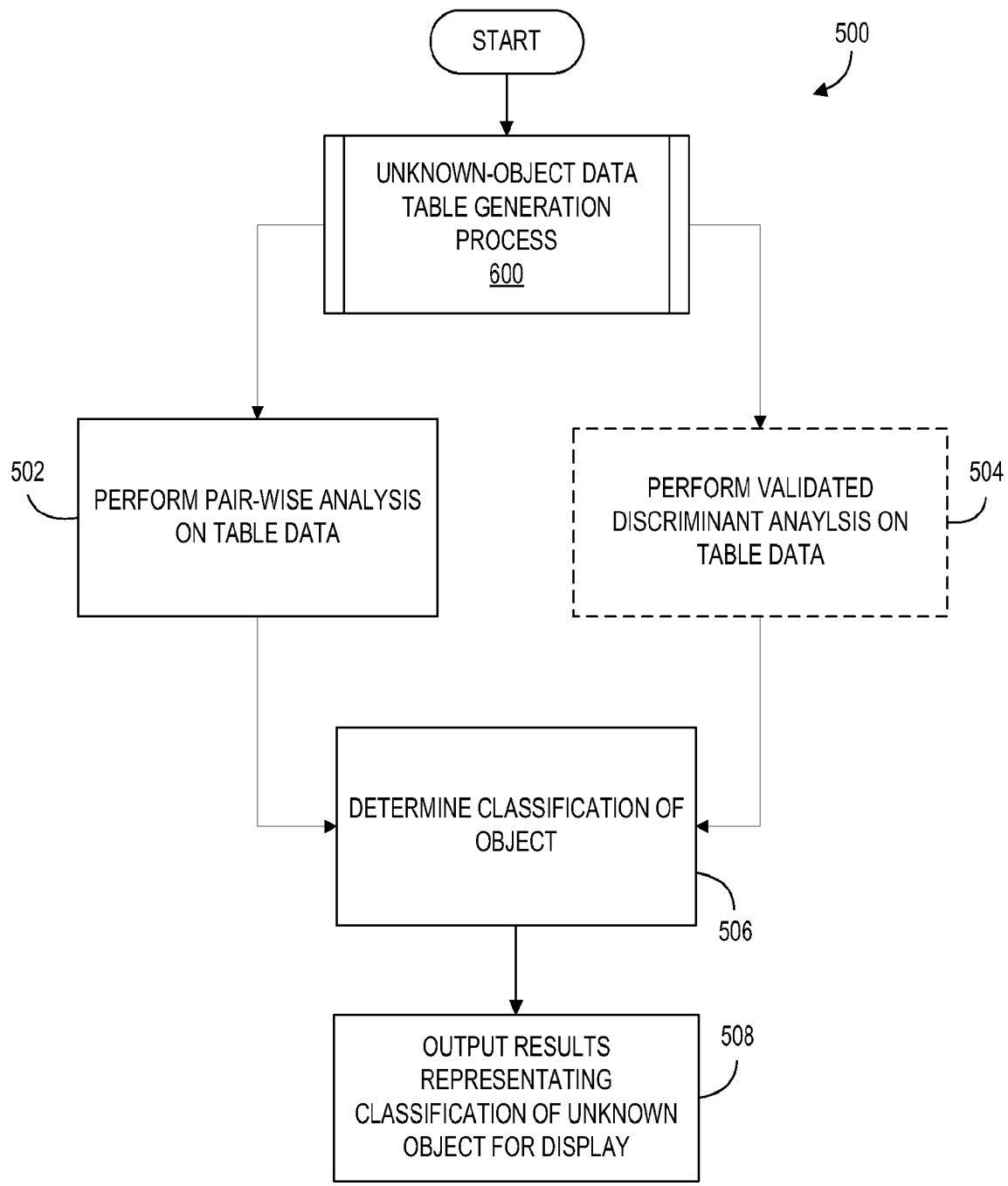
FIG. 5 depicts a flow chart of an example unknown-object classification process 500, according to an example embodiment.
Figure 6:
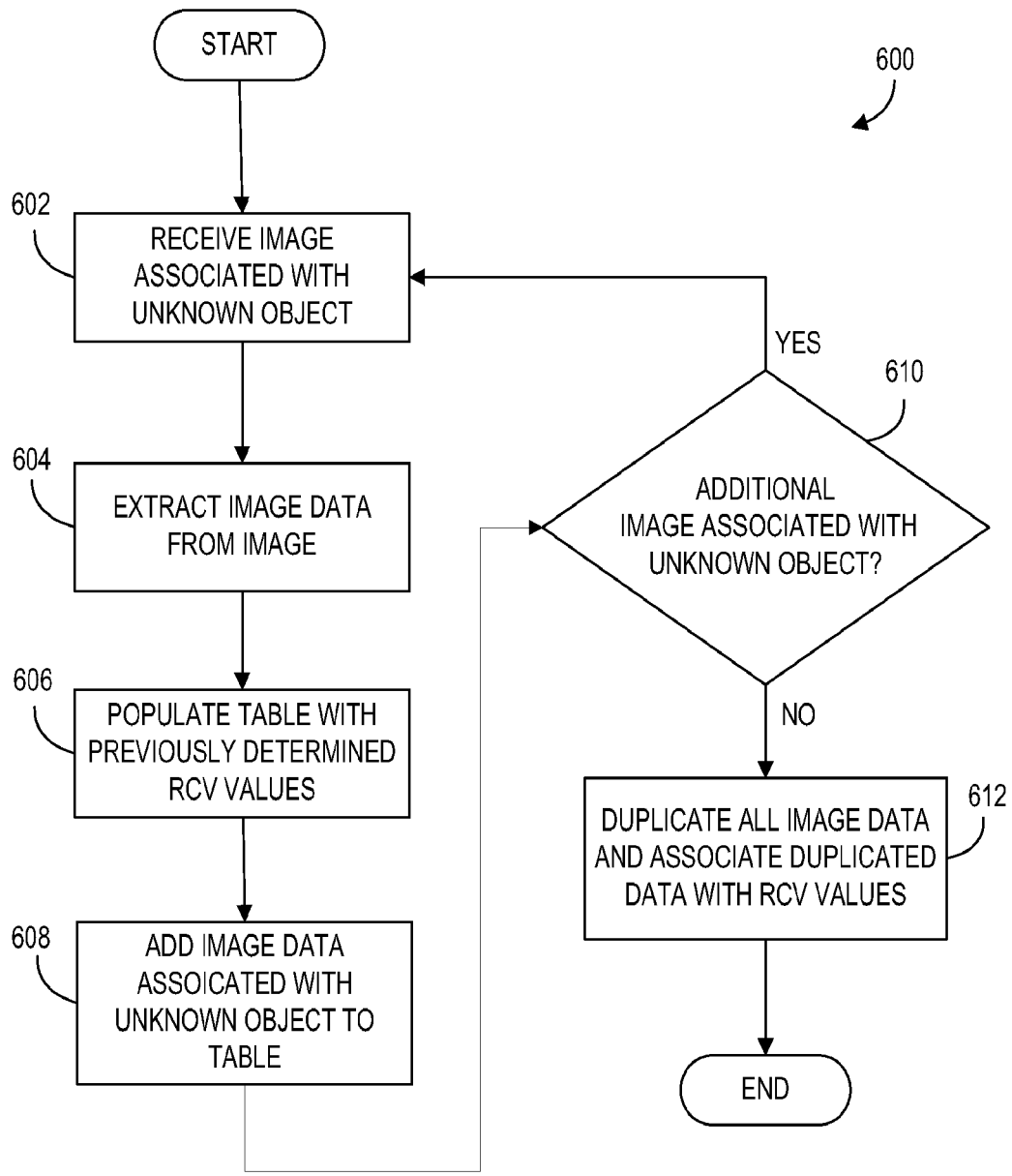
FIG. 6 depicts a flow chart of an example an unknown-object data table generation process 600, according to an example embodiment.

In some embodiments, the object classification system may operate to classify or identify an unknown object in accordance with the unknown-object classification process 500 shown in FIG. 5. In one embodiment, unknown-object classification process 500 begins with an unknown-object data table generation process 600. Although portions of this description make various refers to an "unknown object," (e.g., "unknown-object classification process," "unknown-object data table," etc.) it should be understood by those with skill in the art that the system and methods described herein may also be used to classify known objects. Furthermore, it should be understood that in references to "known objects" (e.g., "known-object data," etc.) may comprise objects and data that are unknown, in some embodiments. According to one embodiment, an unknown-object data table generation process 600 may comprise generating a table of data relating to images of an unknown object that is of the same type as an object classification algorithm of the system. For example, if the system has an object classification algorithm initialized for classifying tigers based on images of their tracks, then the system may classify an unknown tiger by analyzing images of the unknown tiger's tracks. FIG. 6 shows an embodiment of the unknown-object data table generation process 600, which will be further described below. In one embodiment, after generating an unknown-object data table through unknown-object data table generation process 600, the object classification system may perform a pair-wise analysis on the data table, at 502. The pair-wise analysis may compare the data of the unknown-object data table to data in the known-object data table. In various embodiments the data in the known-object table may also be referred to as "comparison data," and it may include data associated with unknown objects. In one embodiment, the pair-wise analysis may comprise generating one or more unknown-object canonical variates corresponding to the set of unknown-object data and generating a number of known-object canonical variates corresponding to a set of known-object data. Discriminant analysis may be used to produce the canonical variates. A canonical variate may be represented as a canonical centroid plot in 2-dimensional space, wherein the canonical centroid plot may be represented as an ellipse. A centroid value may represent the center point of the ellipse. In one embodiment, the system may compare an unknown-object canonical ellipse to a number of known-object canonical ellipses to determine if there is an overlap between them, wherein an overlap may indicate that the unknown-object has the same identity as the known-object it overlaps with. Furthermore, in some embodiments, an ellipse representing an RCV canonical variate may be utilized in the pair-wise comparison to provide stability to the analysis. According to one embodiment, the object classification system may separately perform a validated discriminant analysis on the specified data, at 504. The validated discriminant analysis may be performed in response to receiving a selection of variables. These variables may include, but not be limited to, covariates, classification category, group criterion, validation type, number of folds, stepwise selection of variables and F-ratio. According to one embodiment, upon completing the validated discriminant analysis, the system may generate a canonical plot of canonical variates and data which representthe results of the validated discriminant analysis. For example, a plot may include a series of red data points representing footprints of female tigers and a series of blue data points representing footprints of male tigers, as well as a plotted lines representing variables of an unknown tiger. Thus, in this example, it may be possible to determine the sex of the unknown tiger from the plot output from the validated discriminant analysis. Furthermore, the validated discriminant analysis may also generate a table that gives a predicted probability for each footprint. A validated discriminant analysis may be used to validate a regular discriminant analysis. For example, it may allow the system to partition a data table and then perform may repeated discriminant analyses with different randomly-selected combinations of subsets of test and reference data, to provide a more robust (validated) analysis than one round of discriminant analysis could. As a result of the validated discriminant analysis, the system may determine a classification of a group criterion of the unknown object, such as, for example, sex or age-class.

In response to performing a pair-wise analysis 502 or performing a validated discriminated analysis 504 on the data table, the object classification system may then determine a classification of the object 506. As shown in FIG. 5, performing a validated discriminant analysis 504 is optional and may be performed separately to the pair-wise analysis 504. However, both analyses may collectively be referred to as the process of comparing the image data to a set of comparison data or known-object data. The pair-wise analysis may yield data indicative of an individual classification of the object (i.e., whether or not it has the same identity as another object in the group), and the validated discriminant analysis may yield data indicative of a group criterion classification of the object (e.g., the sex or age-class of the object). Responsive to receiving the results of either or both of the pair-wise and validated discriminant analysis, the object classification system may then output results representing the classification of the unknown object for display at 508.

FIG. 6 shows one embodiment of an unknown-object data table generation process 600. Unknown-object data table generation process 600 may begin at 602, where the system receives an image associated with an unknown object, according to one embodiment. The system may then extract image data from the image associated with an unknown object at 604, in a manner that may be similar or identical to the data extraction 404 of the known-object data table generation process 400. In one embodiment, extracting image data from image 604 may comprise modifying an image of an unknown object such that it is substantially similar in size and orientation to a sample known-object image. Resizing may be performed automatically by the object classification system. Furthermore, the object classification system may automatically account for the depth of an image. Extracting image data may further comprise providing at least one landmark point on the modified image of the unknown object, wherein the at least one landmark point is positioned at a substantially similar location as a sample landmark point provided on the sample known-object image. According to one embodiment, the system may generate at least one "derived point" positioned on the modified image of the unknown object. The at least one derived point may be generated relative to the positions of one or more landmark points. Further, in one embodiment the modified image of the unknown object may include a representation of one at least one measuring reference (e.g., a ruler), and the system may provide two scale points on the modified image of the unknown object, positioned in relation to the measuring reference at a predefined reference distance. For example, scale points may be placed at "2 cm" and "12 cm" of a ruler shown in the unknown-object image to denote a reference distance of 10 cm, to provide a scale for distances in the image. In one embodiment, the system may calculate one or more data points from the unknown-object image, including but not limited to, positions, distances, areas and angles between the landmark points and/or derived points.

According to one embodiment, at 606, the system may then populate a data table with a stored RCV data set. In some embodiments, the stored RCV data set may have been created by the known-object data table generation process 400, at 412. In one embodiment, the system may then add the image data associated with the unknown object to the data table, at 608. Responsive to receiving an indication that there is another image associated with the unknown object that has not yet been processed and added to the data table, the unknown-object data table generation process 600 may proceed from 610 to 602 to receive the next image. In various embodiments, this process may be repeated until all images of the unknown object have been received by the system and had their image data extracted and added to the data table. Once all image data of the unknown object has been added to the data table, prior to ending, unknown-object data table generation process 600 may proceed to 612 wherein the system may duplicate all of the image data of the unknown object in the data table and append the duplicated copy of the image data to the preexisting RCV data set.

Capturing Digital Images

In one embodiment, digital images of an object to be classified may be captured in accordance with a standardized protocol. A standardized image capture protocol may be useful in generating sets of images that are similarly oriented and contain similar data points for comparison. Different standardized image capture protocols may be utilized for different objections and situations. For example, there may be a different standardized image capture protocol used for capturing digital images of animal tracks than there is for capturing digital images of leaves high up in rainforest canopies or semiconductor surfaces. Furthermore, there may be a different standardized protocol for capturing digital images of animal tracks of wild animals versus capturing digital images of animal tracks of captive animals. For example, in one embodiment, a standardized digital image capture protocol for wild animal tracks may include the steps of: 1) finding a trail of at least 10 sets of footprints of the desired animal, 2) selecting the first left-hind footprint (or "track") in the trail, 3) placing a first metric ruler across the bottom axis of the track and a placing a second metric ruler across the left hand axis of the track to provide a scale (such that the rulers do not obstruct the image of the track), 4) placing a photo ID slip in the frame or attaching a voice tag to the image for the purposes of identifying the information of the image such as the date the image was taken, the name of the photographer, an identification of the position of the track in the sequence of tracks (for example the first track in the first trail may be labeled "1a," where the number "1" represents the identification of the set of tracks (i.e., the "trail") and the letter "a" represents the identification of the number of the track within that trail) and other information known about the track, 4) measure and record the depth of the center of the track, 5) align a digital camera over the track such that the track, rulers and tag completely fill the frame of the image and take the digital photo, and 6) repeat these steps until 10 to 15 images of successive left-hind tracks of one continuous trail have been captured. Digital images may be captured by any suitable device, such as a standalone digital camera or a digital camera embedded in a smartphone or tablet.

Extracting Data from a Digital Image

Figure 7:
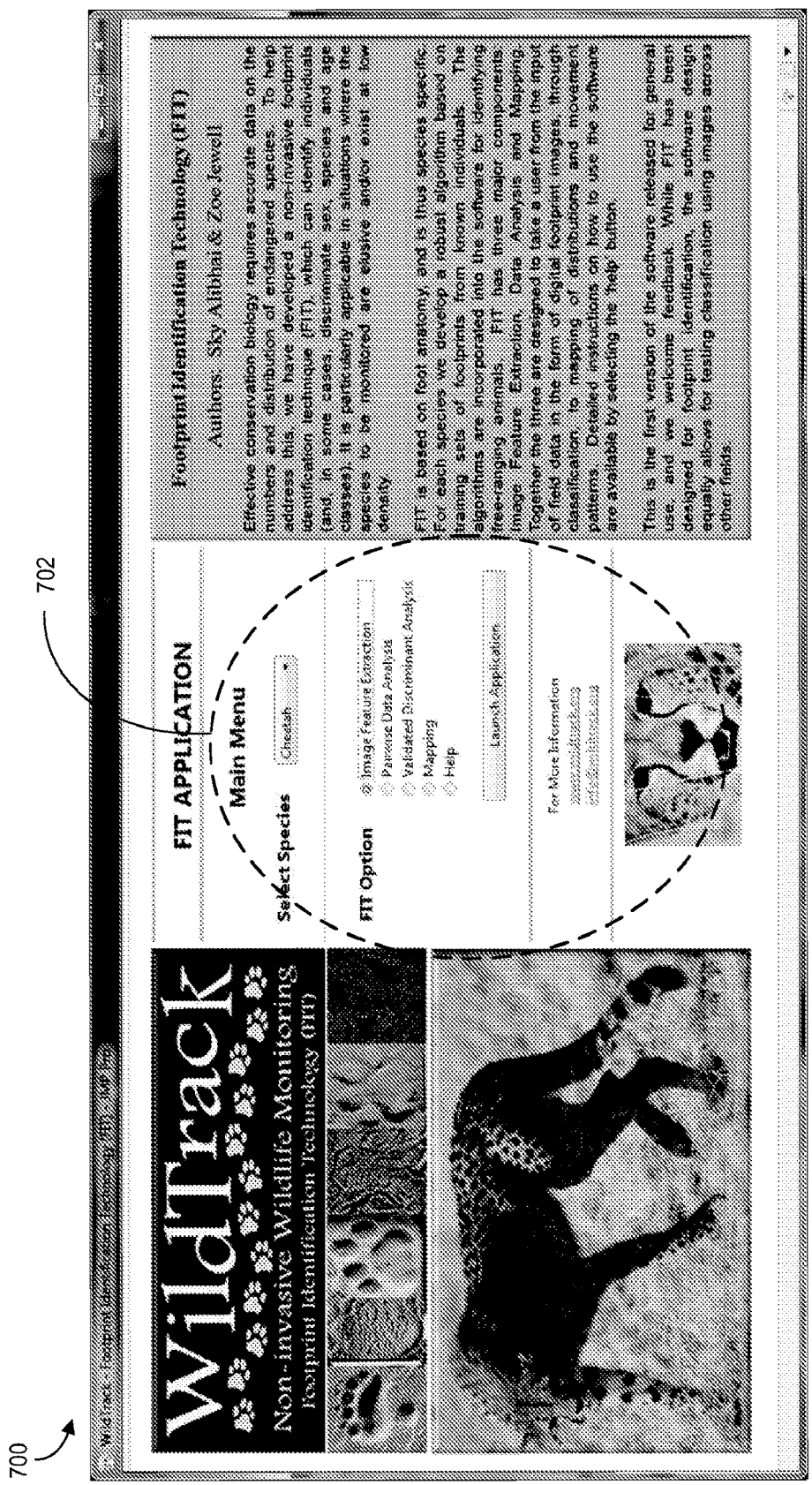
FIG. 7 depicts an example user interface (UI) 700 of the object classification system, according to an example embodiment.

After digital images are captured in accordance with a standardized protocol, the digital images and data associated with the digital images may be exported from the digital camera to the object classification system. FIG. 7 depicts an embodiment of a home screen user interface 700 of the object classification system providing user input elements 702 that may enable a user to specify the type of object or species to which the captured digital images relate and launch a user interface of the object classification system that can enable the importation of images and image data into the system. In various embodiments, the object classification system may comprise a statistical analysis software package, such as JMP software. In addition to receiving the digital image files, the object classification system may also receive other data relating to the images, such as EXIF data of the images. EXIF data may include spatial and temporal data such as timestamps and GPS data which may serve to identify the time and location of each captured image.

Figure 8A:
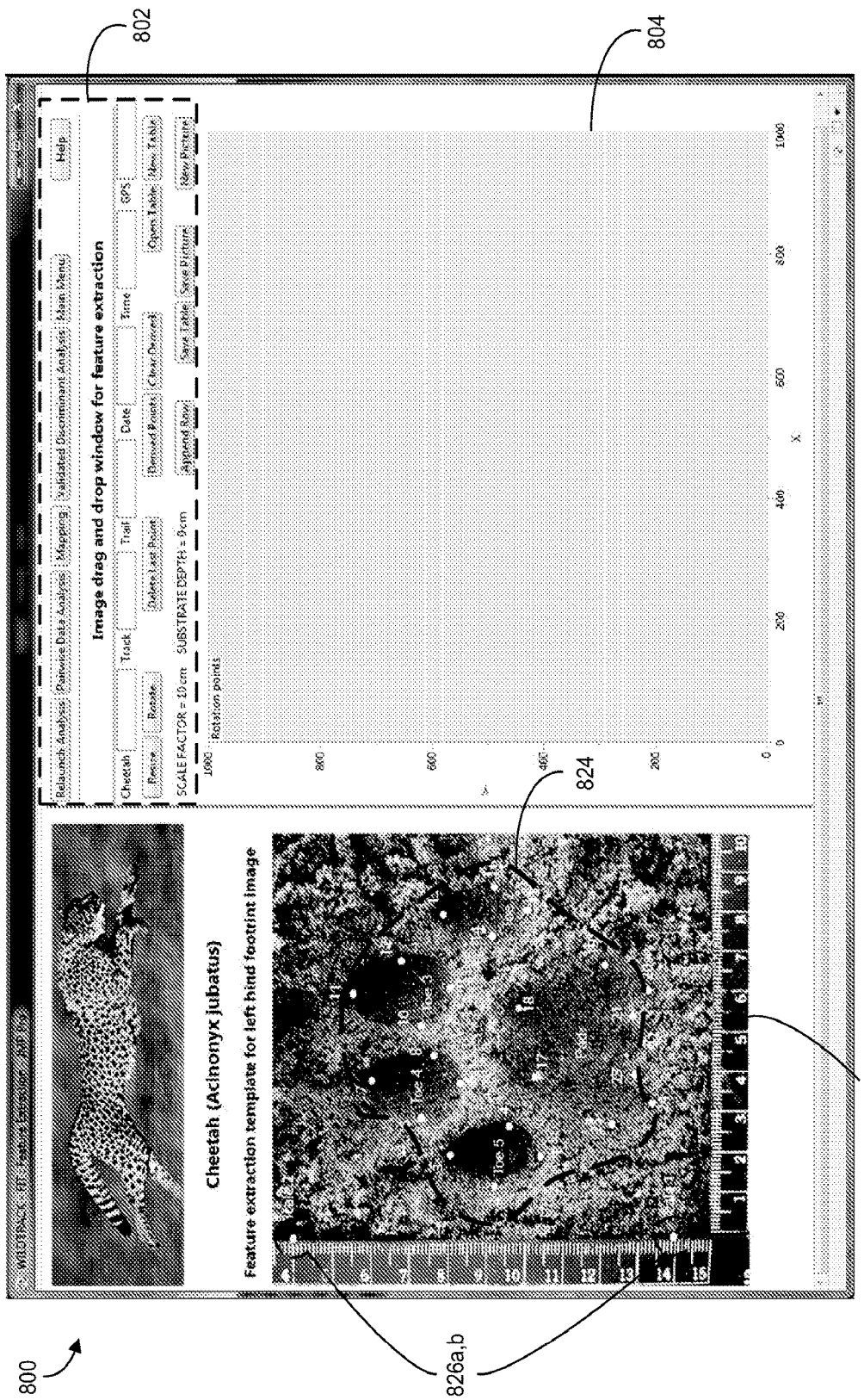
FIG. 8A depicts an example UI 800 of the object classification system, according to an example embodiment.

FIG. 8A depicts an embodiment of a user interface 800 of an object classification system. As shown in FIG. 8A, the user interface 800 may provide user input elements 802, comprising a variety of buttons, text boxes, or other input elements that may enable the input of user commands into the system. According to one embodiment, user input elements 802 may enable a user to launch other user interfaces or modules of the system, manipulate an image, or export data from an image. Further, user interface 800 may provide a graphics frame 804 and a sample object image 806. The graphics frame 804 may be enabled to display an image. In one embodiment, the graphics frame 804 may display an image in response to an image file being dragged onto it. The sample object image 806 may be a sample image of the same object type (for example, a cheetah track as shown in FIG. 8A) of the captured digital images. The sample object image 806 may contain positioned landmark points 824 as determined by the system, which may represent predefined points that ordinarily would be identified on an object or track of this type. For example, in the embodiment depicted in FIG. 8A, the sample object image 806 depicts a left hind footprint of a cheetah containing landmark points 824 that define the contours of the four toes and pad of the footprint, as well as two scale points 826a,b on the left side ruler of the sample image 806 that provide a scale reference by identifying a distance of 10 cm. In one embodiment, the positioned landmark points 824 of sample object image 806 provide a guide for landmark points to be placed on other captured images of cheetah left hind footprints that have been extracted into the system. As will be appreciated, landmark points are significant because they can be used to identify defining features of that type of object. For example, a cheetah paw has four toes and a pad that form a pattern of shapes that is distinct from other animals. The system may utilize landmark points to identify the respective shapes of the footprint (e.g., each toe and the pad), and it may gather specific data about a particular footprint by, for example, measuring distances and angles between landmark points.

Figure 8B:
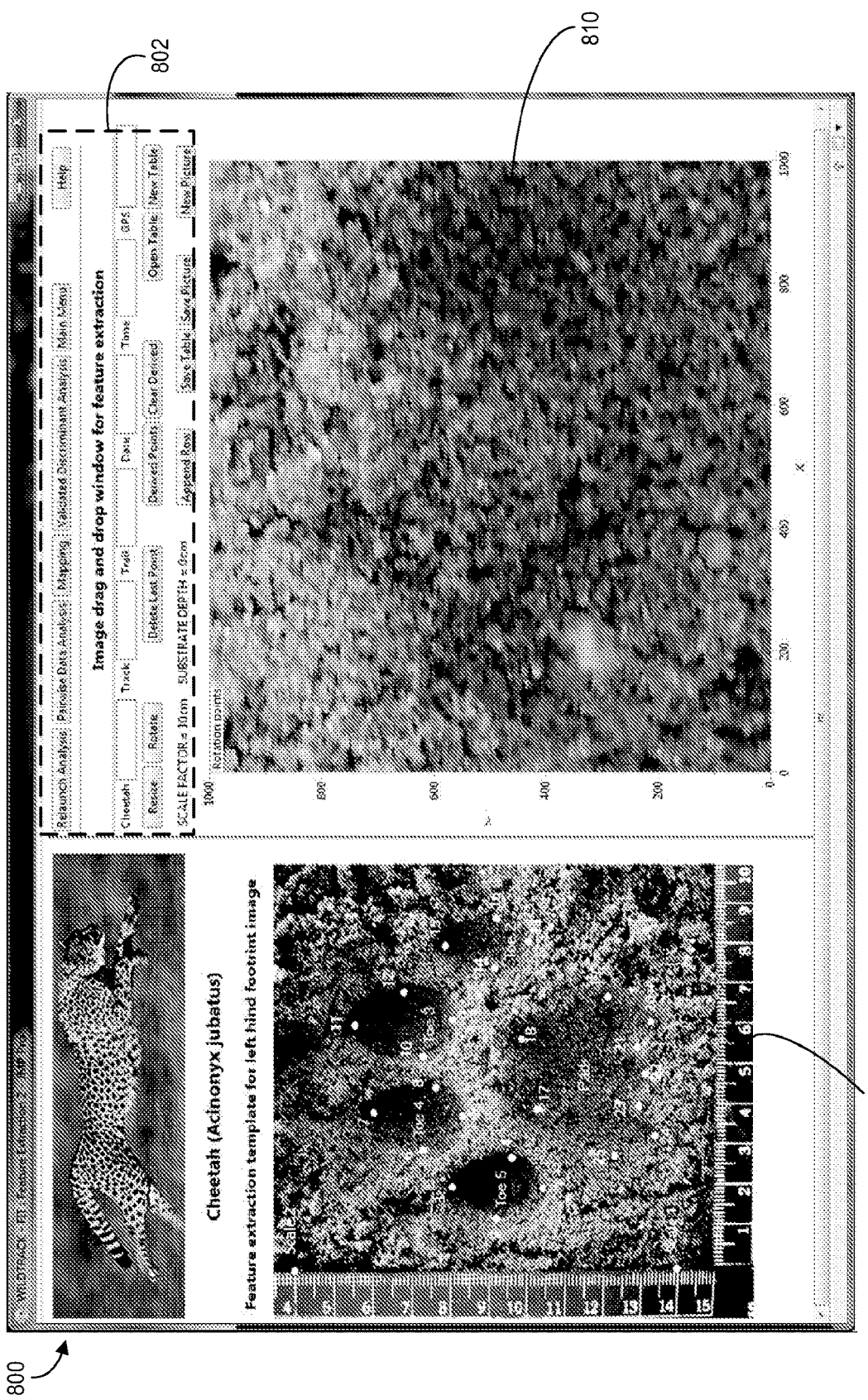
FIG. 8B depicts an example UI 800 of the object classification system, according to an example embodiment.
Figure 8C:
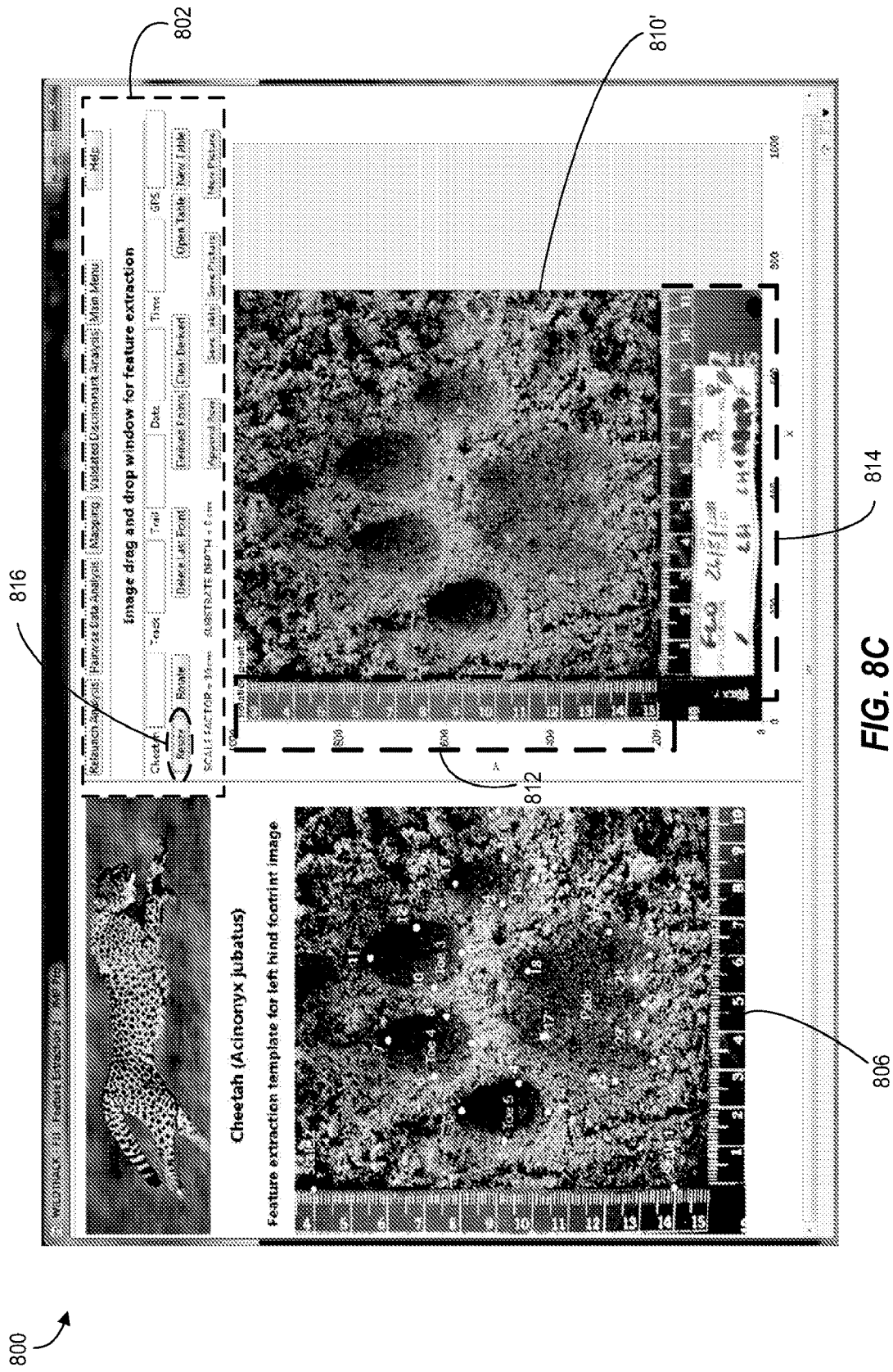
FIG. 8C depicts an example UI 800 of the object classification system, according to an example embodiment.

FIG. 8B depicts an embodiment of a user interface 800 of the object classification system that has been updated to show a representation of a received image 810, imported from, for example, a digital camera. In some embodiments, a received image 810 may be received by the object identification system by dragging an image file onto graphics frame 804 in a conventional drag-and-drop manner. In some embodiments, the resolution of the received image 810 may require adjustment so that the size of the received image 810 shown in graphics frame 804 is substantially similar to the size of the sample object image 806. FIG. 8C depicts an embodiment of a user interface 800 of the object classification system wherein the system has adjusted the resolution of the received digital image 810 has to yield resized image 810'. In one embodiment, the system may resize the image such that the size of resized image 810' is substantially the same as the size of sample object image 806. In various embodiments, the resolution or size of a received digital image may be automatically adjusted in response to a selection of the "Resize" input element 816 of user input elements 802. In various embodiments, a measuring reference 812 (e.g., a vertical ruler) and a measuring reference 814 (e.g., a horizontal ruler) may be depicted as part of resized image 810'.

Figure 8D:
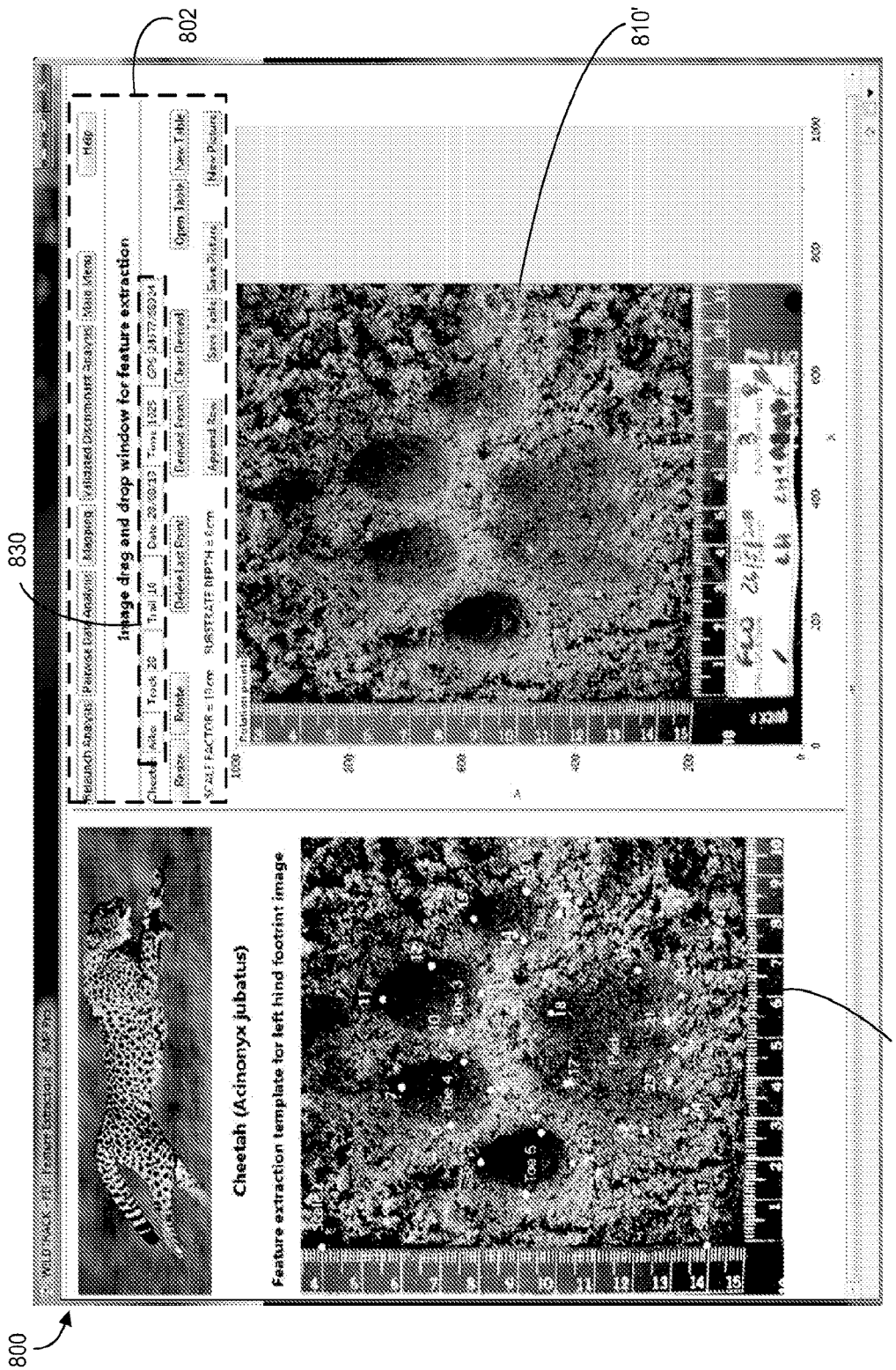
FIG. 8D depicts an example UI 800 of the object classification system, according to an example embodiment.
Figure 8E:
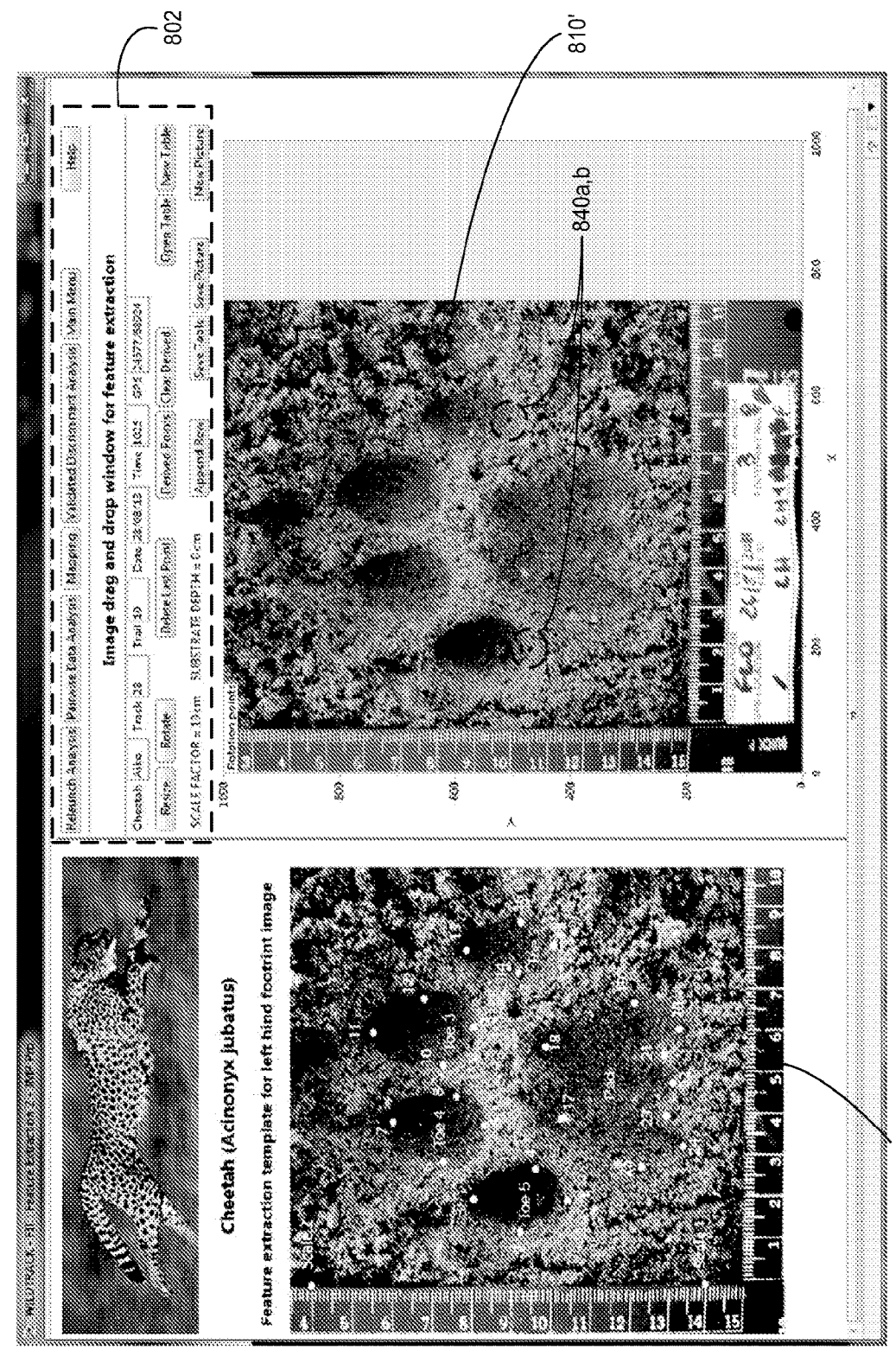
FIG. 8E depicts an example UI 800 of the object classification system, according to an example embodiment.
Figure 8F:
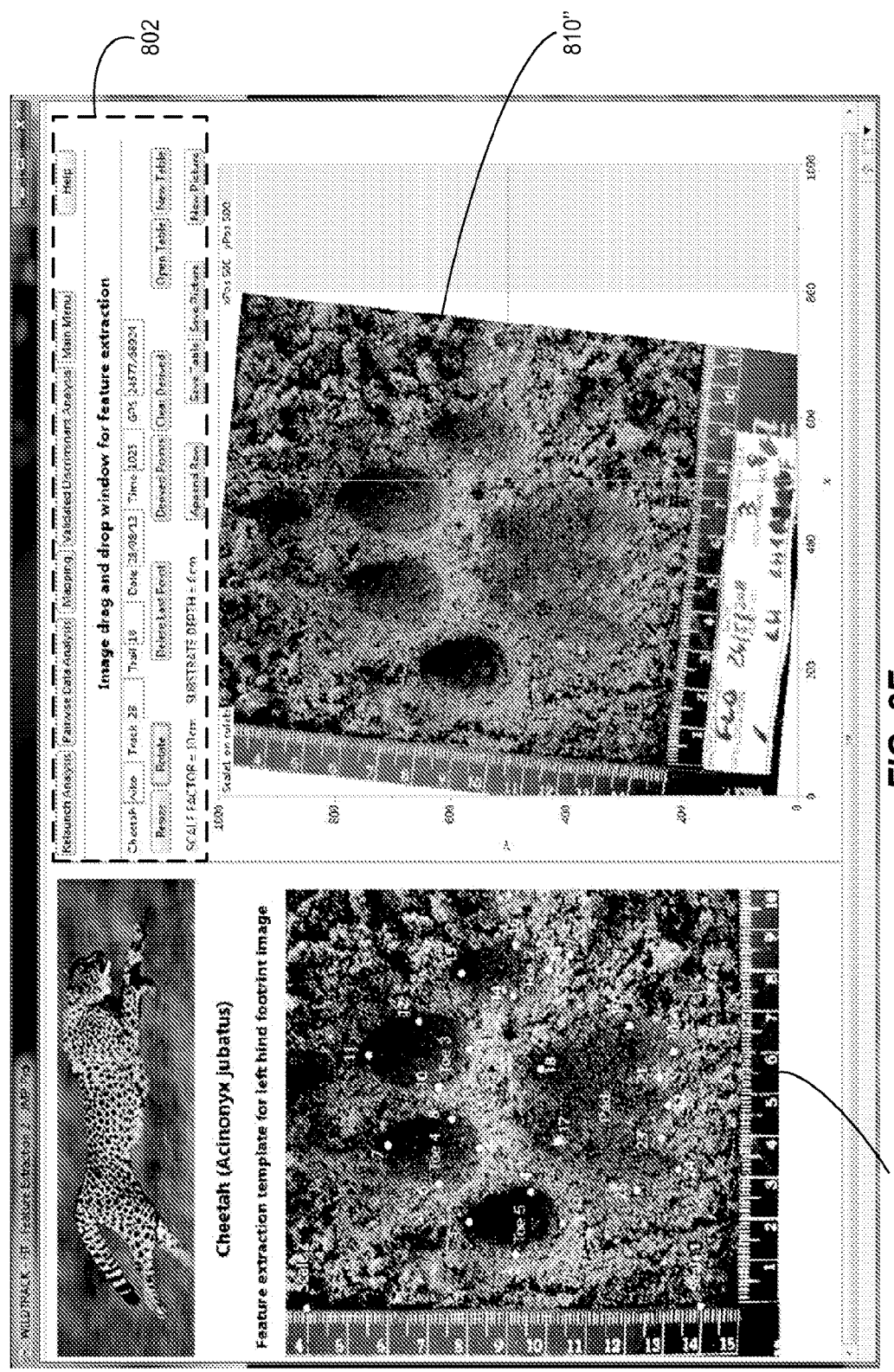
FIG. 8F depicts an example UI 800 of the object classification system, according to an example embodiment.
Figure 8G:
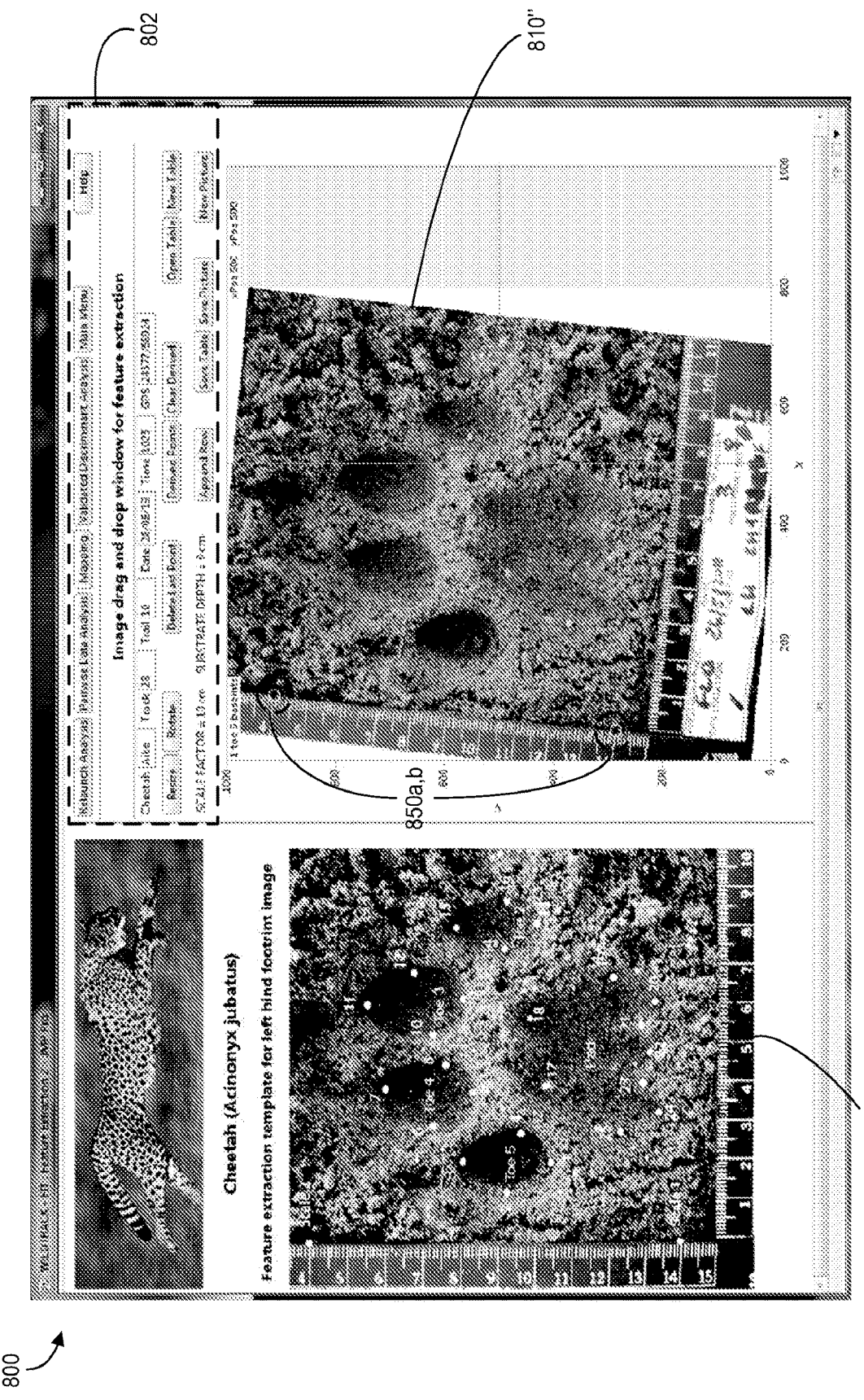
FIG. 8G depicts an example UI 800 of the object classification system, according to an example embodiment.
Figure 8H:
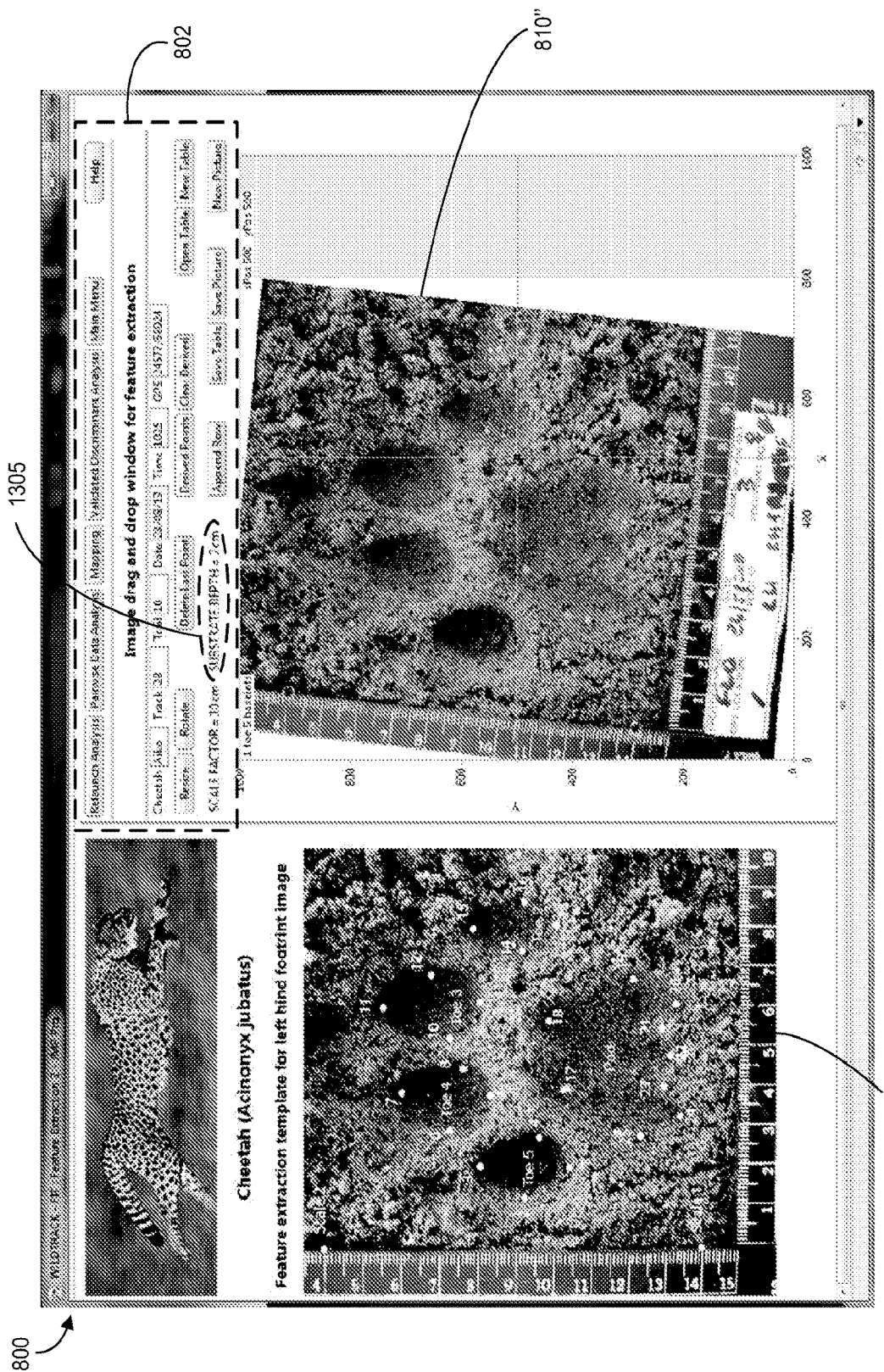
FIG. 8H depicts an example UI 800 of the object classification system, according to an example embodiment.

In various embodiments of the object classification system, the system may receive EXIF data of captured digital images when the captured digital image is imported into the system. In various embodiments, the system may receive other data relating to the captured images through user input. FIG. 8D depicts an embodiment of a user interface 800 of the object classification system wherein the system receives data relating to the captured digital image through various user input elements 802. For example, text boxes 830 of user input elements 802 may receive data relating to the image input by a user. In embodiments relating to the identification of animal tracks, such data may include but not be limited to, the species of animal, the identifying number of the trail, the identifying number of the track, the date of capture of the image, the time of capture of the image, and GPS data indicating the location of the track. In other embodiments, some or all of the text boxes 830 may be automatically populated by the system based on imported image data, such as EXIF data. Furthermore, the system may receive other data relating to the track, such as the depth of the track in the substrate. FIG. 8H depicts an embodiment of a user interface 800 of the object classification system wherein the system receives substrate depth data through a substrate depth input box 860 of the user input elements 802.

In various embodiments, a resized image 810' may not have an alignment that is substantially the same as the sample object image 806. In such cases it may be desirable for the system to rotate resized image 810' to substantially match the orientation of the sample object image 806. Accordingly, in some embodiments, two image rotation points 840a,b may be placed on top of the resized image 810'. The system may use these rotation points to rotate the resized image 810' to a substantially similar orientation as the sample object image 806. FIG. 8E depicts an embodiment of a user interface 800 of the object classification system wherein the system has provided two image rotation points 840a,b on the resized image 810'. In this embodiment, the system has provided one image rotation point at the central base points of each of the first and fourth toes of the footprint. In one embodiment, the sample object image 806 may have a predefined orientation such that a line drawn between image rotation points placed at the central base points of the first and fourth toes would be perpendicular to the frame of the user interface 800. In an exemplary embodiment, the system may rotate resized image 810' such that a line drawn between the two image rotation points 840a,b may be perpendicular to the frame of the user interface 800. Accordingly, in one embodiment, the system may rotate resized image 810' such that it has the same orientation as the sample object image 806. FIG. 8F depicts an embodiment of a user interface 800 of the object classification system wherein the system has rotated resized image 810' to generate rotated image 810". In one embodiment, rotated image 810" may have an orientation that is substantially similar to the sample object image 806. It may be desirable to have a uniform orientation for all images of a particular object type in order to facilitate statistical comparisons of image data between the images.

It may also be desirable to create further uniformity among images for comparison by ensuring that each object image received by the system may be normalized against the same distance scale. In some embodiments, the system may provide two scale points on top of a received object image in relation to a measuring reference (e.g., a ruler) to represent a specified reference distance so that other distances within the image may be determined accurately. For example, FIG. 8G depicts an embodiment of a user interface 800 of the object classification system including rotated image 810", wherein two scale points 850a,b may be provided on rotated image 810" at points on the vertical ruler that are spaced 10 cm apart. Accordingly, the object classification system may utilize the two scale points as a distance reference for calculating the distances between any other two marked points in the image. In some embodiments, scale points 850a,b may be provided on the image by a user using, for example, a point-and-click. In other embodiments, scale points 850a,b may be provided by the system by referencing the image of the ruler. The scale points 850a,b may be provided to represent a distance in the image that is specified by an administrator of the system.

Figure 8I:
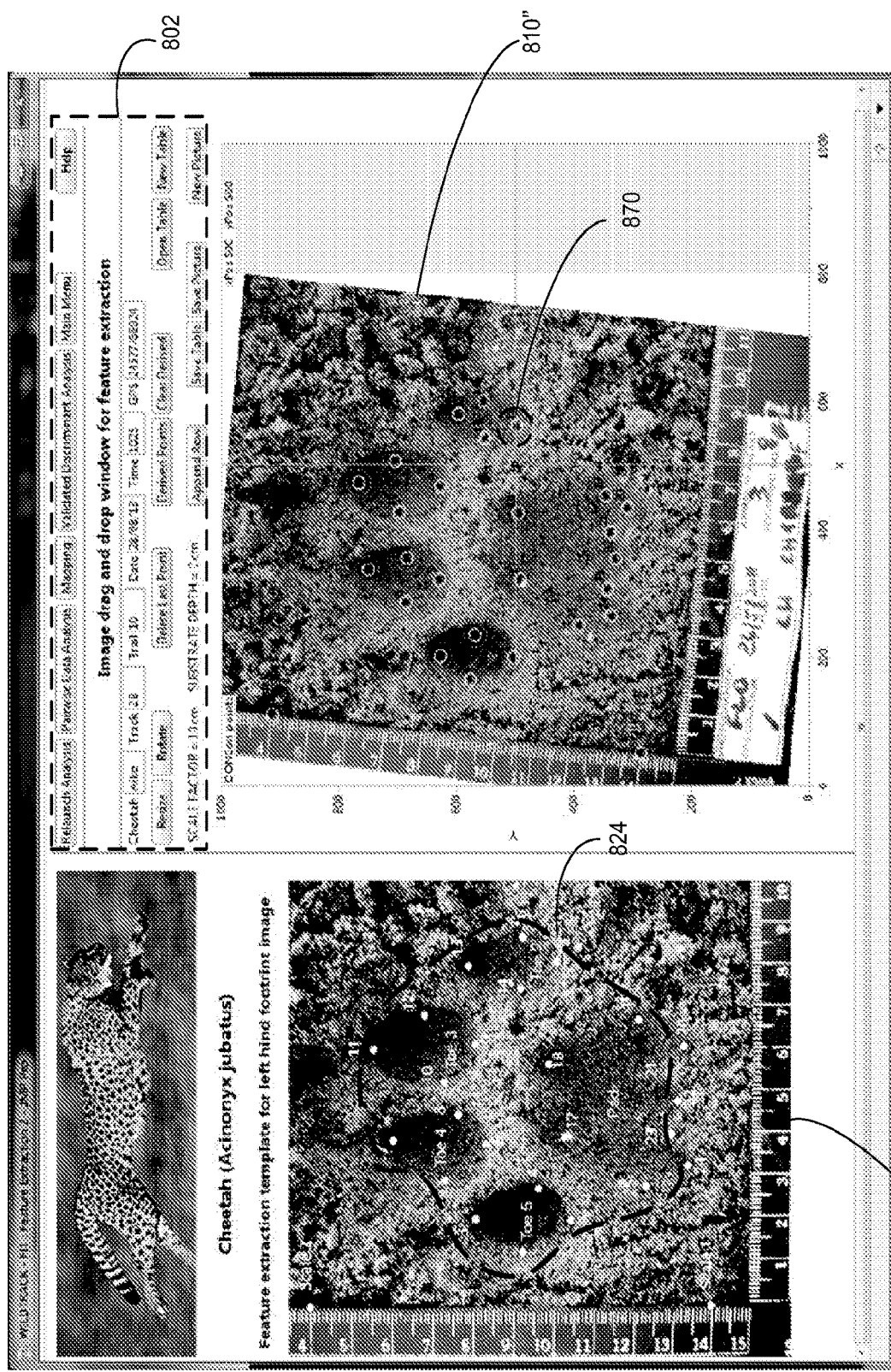
FIG. 8I depicts an example UI 800 of the object classification system, according to an example embodiment.

As was previously described above, a sample object image 806 of an embodiment of the object classification system may have a number of positioned landmark points 824 (which may be referred to as "sample landmark points"). The set of positioned landmark points 824 may define regions of the image that may be specific to a particular type of object or species. Positioned landmark points 824 of a sample object image 806 may be predefined by system administrators in order to designate points of interest for that type of object. The system may extract data relating to an object by measuring areas, distances and angles between various points of interest. Accordingly, it may be desirable to provide a matching set of landmark points on a received object image so that the relevant image data may be determined and extracted from the received image. FIG. 8I depicts an embodiment of a user interface 800 of the object classification system depicting a landmark point 870, which may be a member of a set of landmark points. The set of landmark points may be marked on the rotated image 810" such that they match the positions of the set of positioned landmark points 824 on the sample object image 806, relative to the features of the object. For example, in the embodiment in FIG. 8I, a first group of landmark points may define the contours of the first toe on both sample object image 806 and rotated image 810", a second group of landmark points may define the contours of the second toe on each image, and so on. The positions of the sample landmark points may be predetermined based on knowledge of defining characteristics of the anatomy, design or topography of an object. In various embodiments, the object classification system may enable a user to specify the locations of the landmark points (e.g., 870) on the received object image.

Figure 8J:
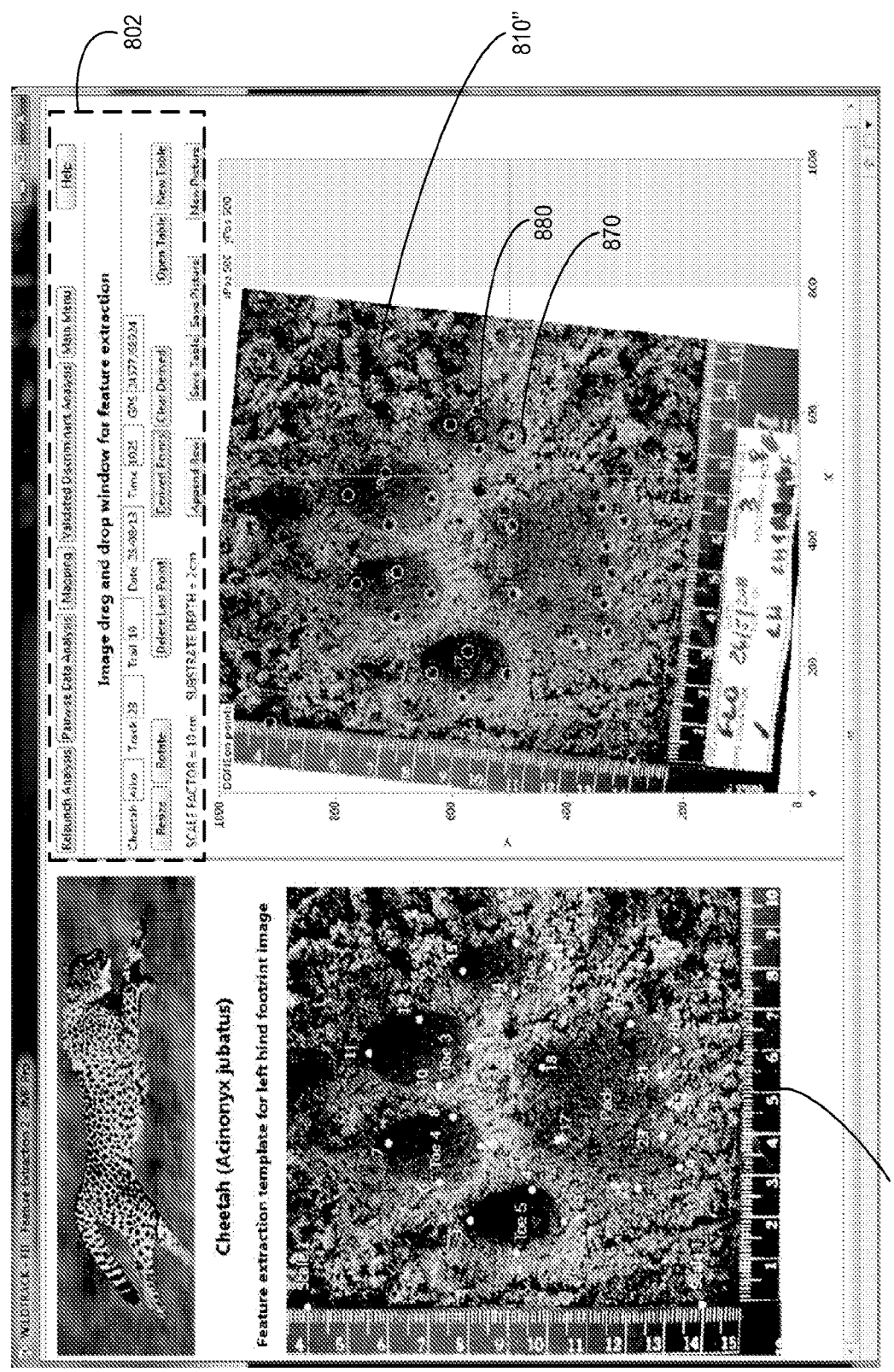
FIG. 8J depicts an example UI 800 of the object classification system, according to an example embodiment.

In addition to specifying landmark points on a received object image, the system may further generate various "derived points" in response to the provided landmark points, according to one embodiment. Derived points may be a set of predefined points whose positions may be calculated based on the positions of the placed landmark points. For example, the system may place a derived point at the midway point between two landmark points. The number and positions of the derived points may be different for different object types. For example, the system may utilize one set of derived points for cheetah tracks and another set of derived points for rhino tracks. In one embodiment, system administrators may predefine the number of derived points and their locations relative to the landmark points. FIG. 8J depicts an embodiment of a user interface 800 of the object classification system showing rotated image 810" having landmark point 870, a derived point 880, and wherein a plurality of derived points (e.g., 880) is provided by the object classification system in relation to the landmark points (e.g., 870). In one embodiment, the system may perform calculations to generate image data in relation to the landmark points (e.g., 870) and the derived points (e.g., 880), such as, for example, the areas, distances and angles between various landmark points and derived points.

Figure 8K:
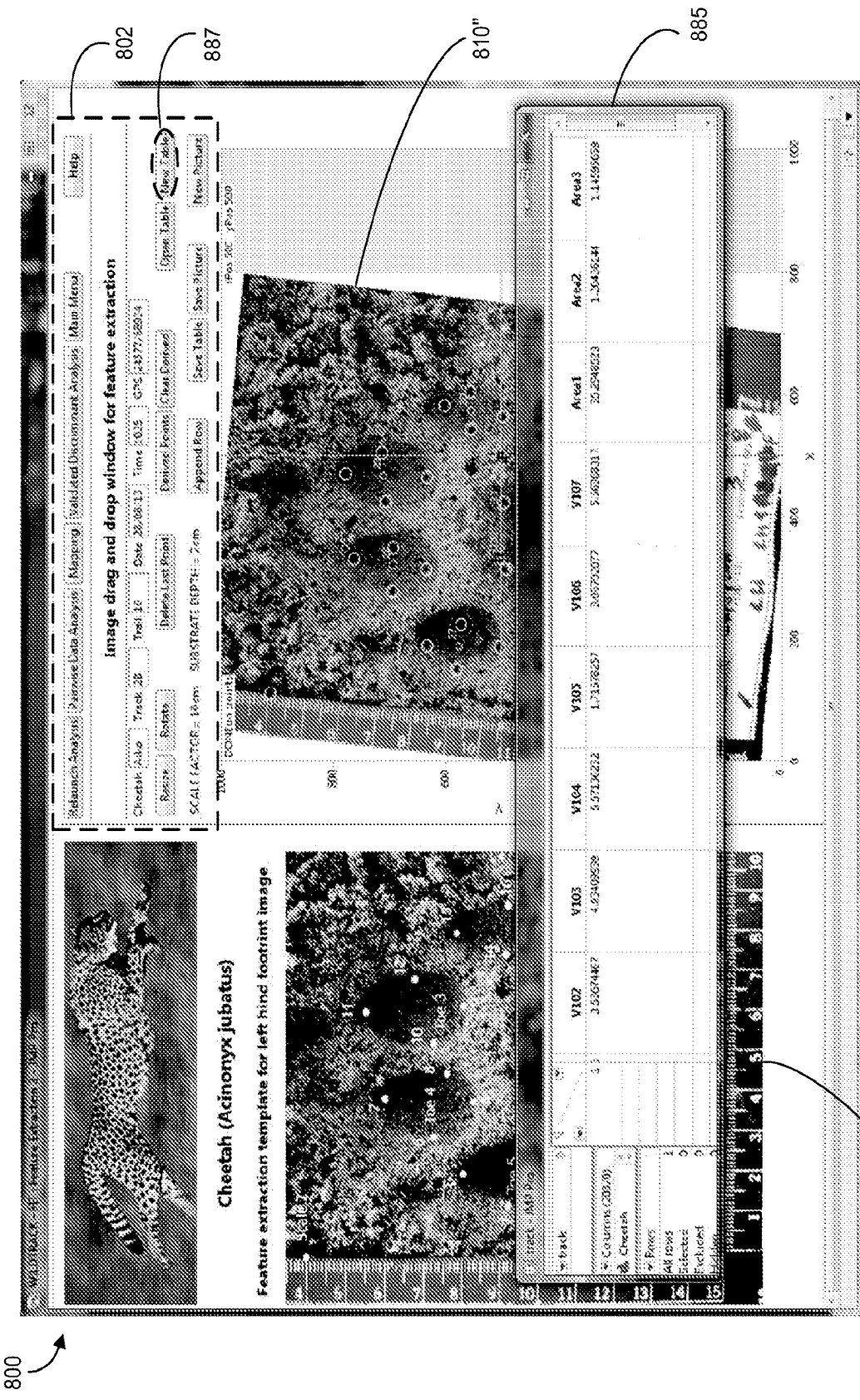
FIG. 8K depicts an example UI 800 of the object classification system, according to an example embodiment.

As discussed, in various embodiments, the object classification system may generate a data table containing data relating to the received image. The data table may include for example, but not limited to, the x and y coordinates for each landmark point and derived point provided on the received image, and a series of distances, angles, and areas calculated by the object classification system in relation to a received image. In one embodiment, a system administrator may predefine a set of calculations to generate a particular set of distances, angles and areas that are specific to a particular type of object that is sought to be classified. For example, the system may perform one set of calculations to generate image data from an image of a cheetah track, and it may perform a different set of calculations to generate image data from an image of a rhino track. In various embodiments the calculated distances, angles, and areas may be calculated using the positions of the landmark points and derived points and may further incorporate the use of other image data such as substrate depth and the distance between the scale points. FIG. 8K depicts an embodiment of a user interface 800 of the object classification system showing an exemplary data table 885 with one row of image data generated by the system from one received 885 in response to a user input, such as for example, in response to a selection of a "New Table" button 887 of user input elements 802.

Figure 8L:
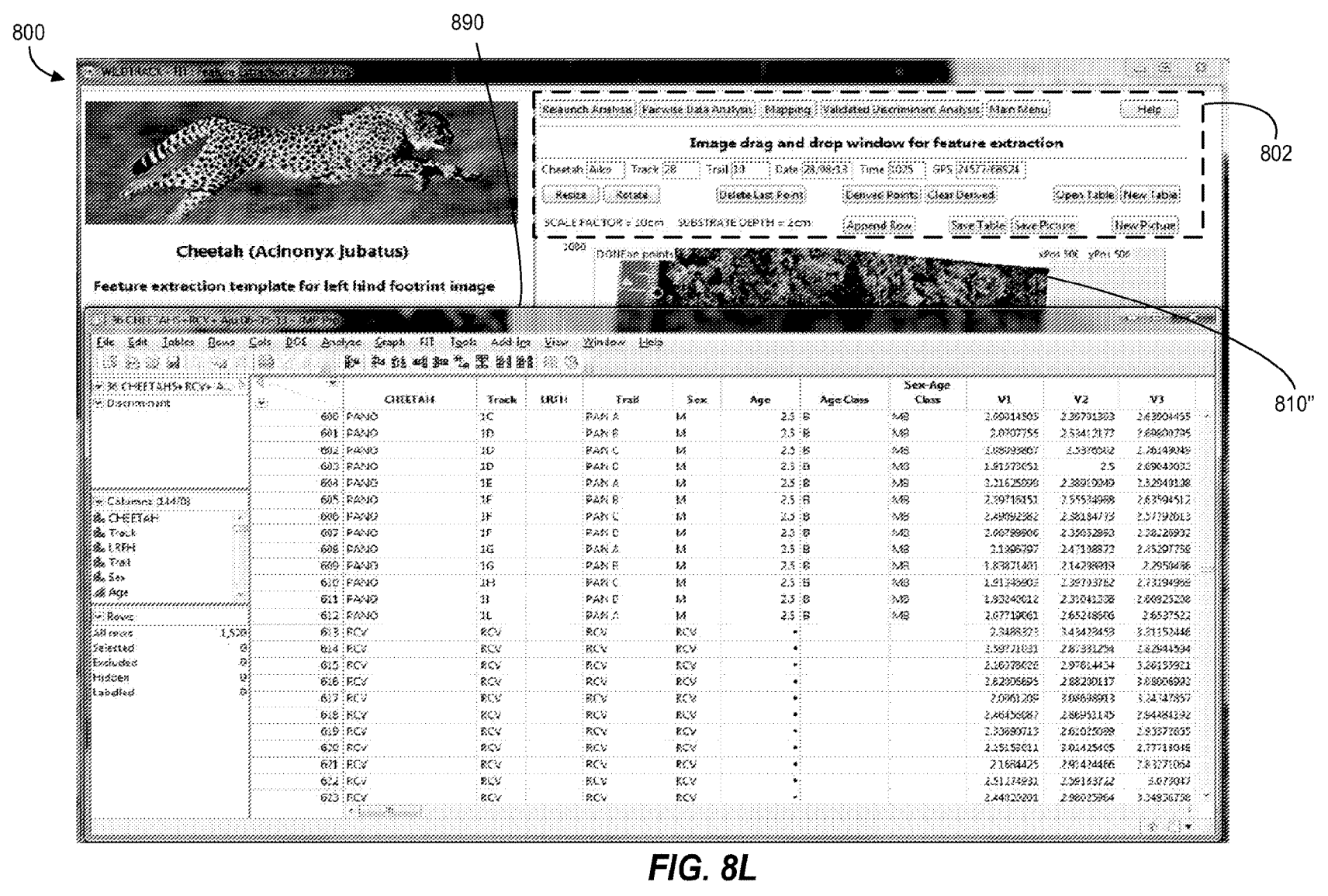

The process of receiving an object image and associated data, resizing the image, receiving data associated with the received image, placing rotation points and adjusting the alignment of the received image, providing scales points, landmark points and derived points on the received image, and extracting image data from the received image and adding it to a data table may be repeated by the system for each captured object image of in the set. For example, if a set comprises 12 digital images of cheetah footprints, the object classification system may carry out the process described above 12 times to generate data in a data table for all 12 images. Furthermore, the object classification system may carry out the process described above for images of both known and unknown objects. FIG. 8L depicts an embodiment of a user interface 800 of the object classification system showing an exemplary data table 890 containing a plurality of rows of image data. In a case where the images received by the system are of a known object, the system may associate the generated image data with the known object by receiving additional data in the data table. The additional data may be representative of known identities and characteristics of the object. For example, if the system generates a data table 890 in accordance with the process described above, in response to receiving a plurality of images of a known cheetah, wherein one row of data corresponds to one received image of the known cheetah, the system may associate the image data with the known features of the animal, such as the sex of the animal, the age of the animal, and the identity of the individual animal. Accordingly, in this embodiment, some rows of data of the data table 890 of the embodiment depicted in FIG. 8L depict data for known animals. As shown in FIG. 8L, the columns "Cheetah," "Track," "Trail," "Sex," "Age," "Age Class" and "Sex-Age Class" may be populated with data, indicating the data set in the row is associated with a known object. In one embodiment, additional data relating to a known object may be added to the data table through user input.

As described above, before the object classification system may be utilized to classify and identify unknown objects, the system may first be populated with data relating to a set of known objects for comparison (a training set). For example, before an unknown trail of cheetah tracks may be classified by the system, the system must first have a set of known cheetah tracks to use in comparison to the unknown trail of cheetah tracks. According to one embodiment, the system may be used to initialize an object classification algorithm from a training set of images of the same type of object as the unknown object that is sought to be classified. While the initialization of an object classification algorithm is described in greater detail below, in various embodiments, before initializing an algorithm the system may first receive a set of known-object data. Accordingly, in some embodiments, the process of receiving images and populating a data table with extracted image data may be carried out with a set of known objects before an unknown object may classified by the system. As previously described above, in various embodiments, the system may generate and utilize a reference centroid value (RCV) data set from the training set. For example, in one embodiment, once the image data from the training set images is extracted and placed into a data table by the system, the system may then duplicate the image data in the table and label the duplicate copy as the RCV data set. As previously described, system may utilize the RCV data set to stabilize pair-wise comparisons of object sets. The data table 890 of FIG. 8L depicts a portion of an exemplary RCV data set.

Processing Image Data to Identify Object

Figure 9A:
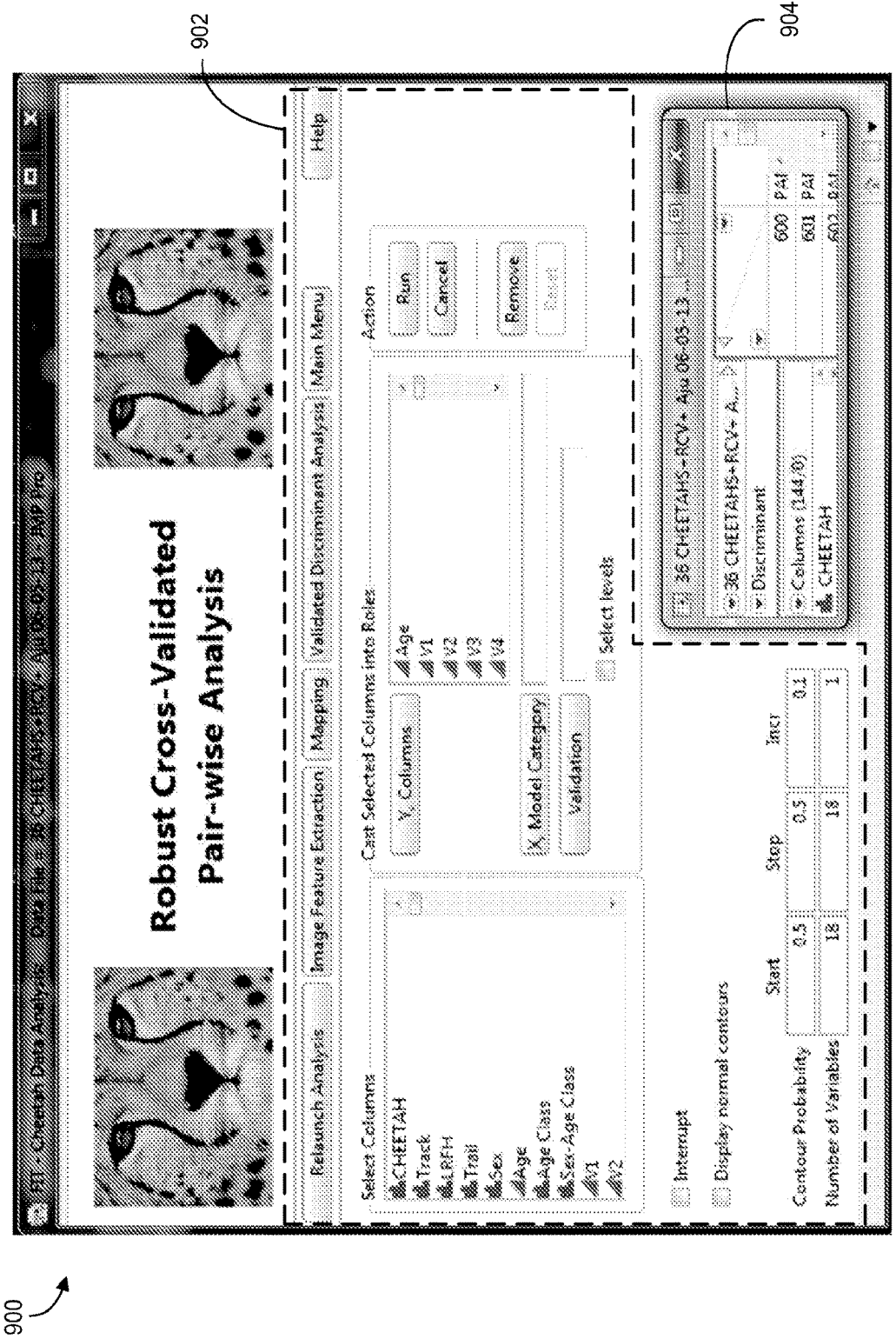
FIG. 9A depicts an example UI 900 of the object classification system, according to an example embodiment.
Figure 9B:
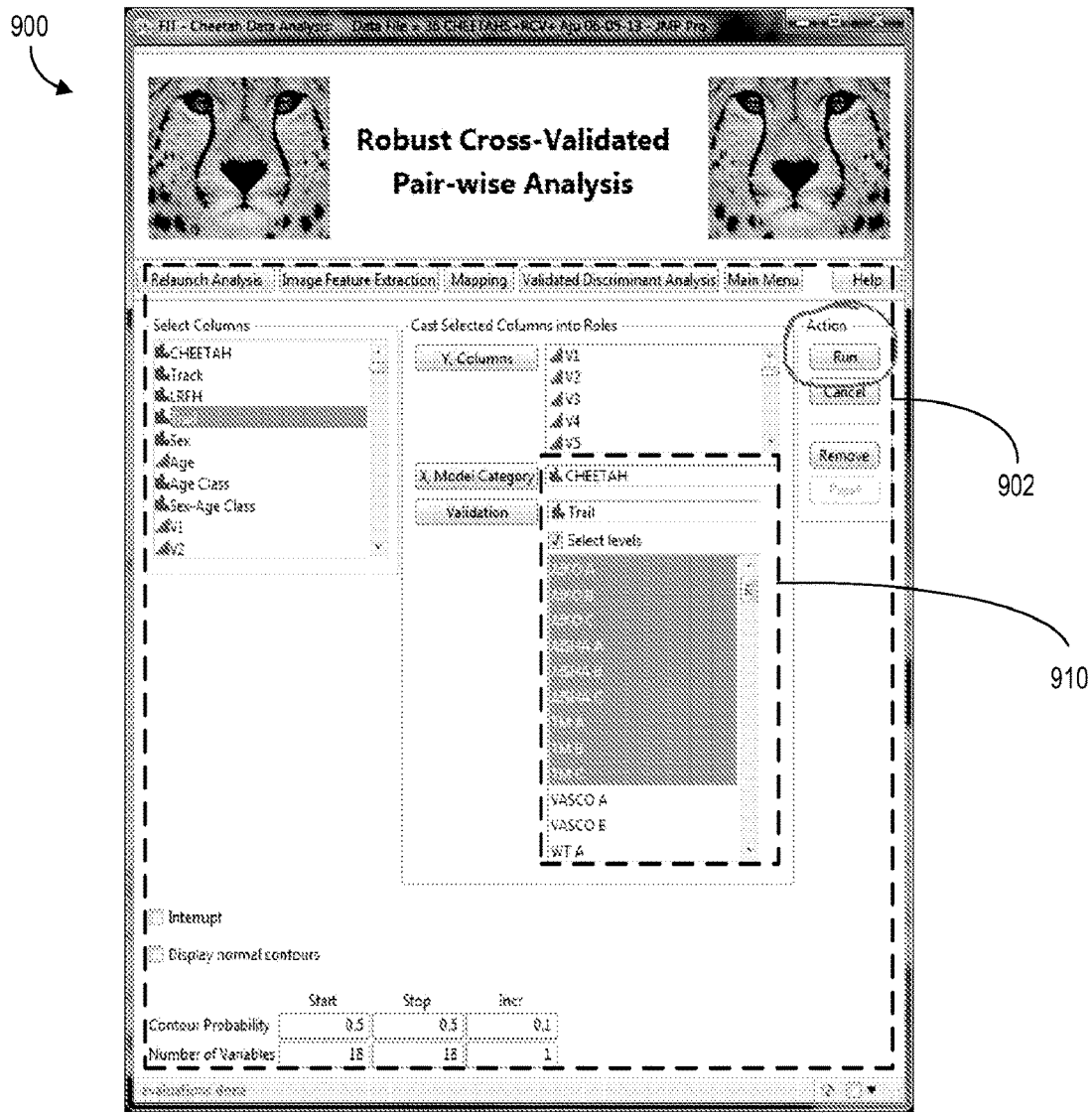
FIG. 9B depicts an example UI 900 of the object classification system, according to an example embodiment.
Figure 9C:
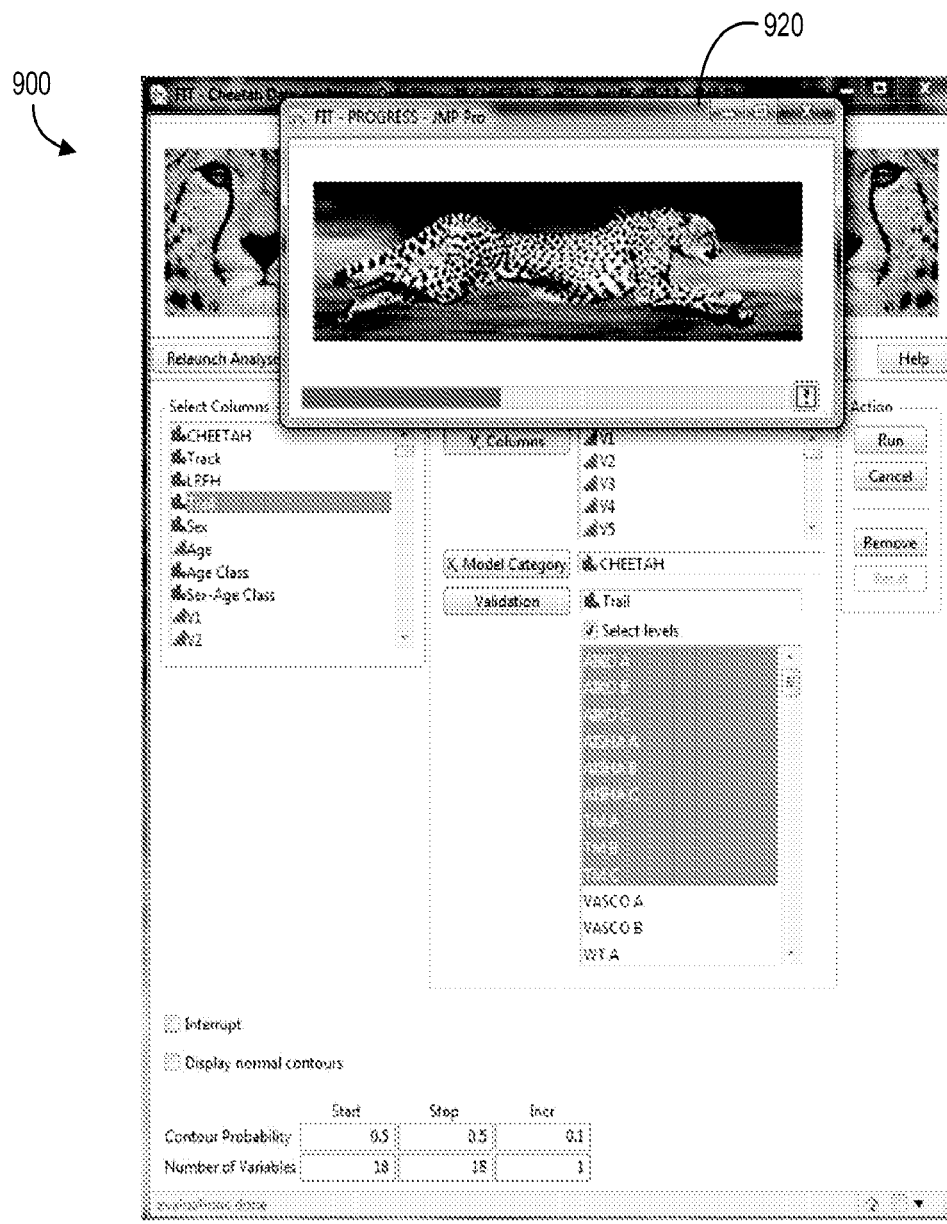
FIG. 9C depicts an example UI 900 of the object classification system, according to an example embodiment.

In one embodiment, the object classification system may generate or initialize an object classification algorithm that may be customized for a particular type of object, and which may be used in classifying unknown objects of that object-type. In various embodiments, the algorithm initialization may comprise the use of the RCV data set in a robust cross-validated pair-wise analysis. FIG. 9A depicts an embodiment of an analysis user interface 900 of the object classification system providing a plurality of user control elements 902. User control elements 902 may be used to set the parameters of the pair-wise analysis conducted by the object classification system. For example, the "Contour Probability" element of user control elements 902 may be used to alter the diameter of the confidence interval ellipses being compared. Furthermore, the "Number of Variables" element of user control elements 902 may determine the distance between the centroid values of the two ellipses being compared. In various embodiments, both of these features may be utilized for the development of the initial discriminating algorithm. As shown in the embodiment in FIG. 9A, the object classification system may carry out a pair-wise analysis in response to the selection of various analysis parameters such as the X Model Category (e.g., cheetah), a validation (e.g., trail), and select levels (i.e., which trails to compare). Y columns (e.g., footprint measurements), as continuous variables, may be automatically populated by the system. The X Model Category ("x input") may represent the type of object or model to be used for classification. The Y columns ("y inputs") may represent data extracted or measured from object images. FIG. 9B depicts an embodiment of an exemplary analysis user interface 900 providing a number of user control elements 902. User control elements 902 may further a validation input 910. The validation input 910 may enable the selection of data sets to be compared by pair-wise analysis. For example, as shown in the embodiment in FIG. 9B, the validation input 910 is set as "Trail," which may enable the system to compare trails side by side. FIG. 9B further shows a series of highlighted "Select Levels," which may represent the selected trails to be compared, as well as a "Run" button that, when selected, may cause the system to run the pair-wise analysis. FIG. 9C depicts an embodiment of an analysis user interface 900 of the object classification system wherein the system is in the process of executing pair-wise comparisons as indicated by a progress bar 920.

Figure 9D:
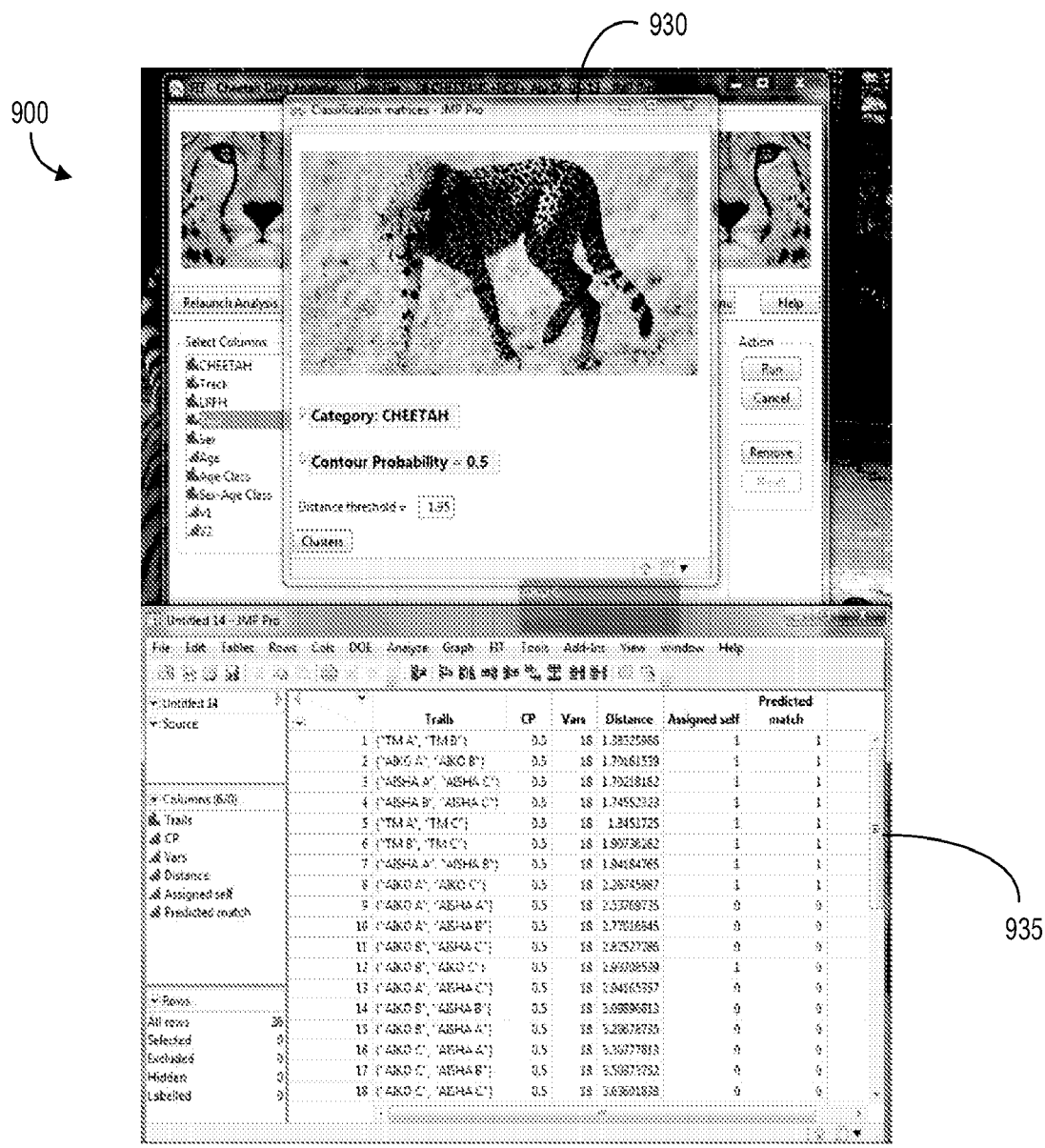
FIG. 9D depicts an example UI 900 of the object classification system, according to an example embodiment.
Figure 9E:
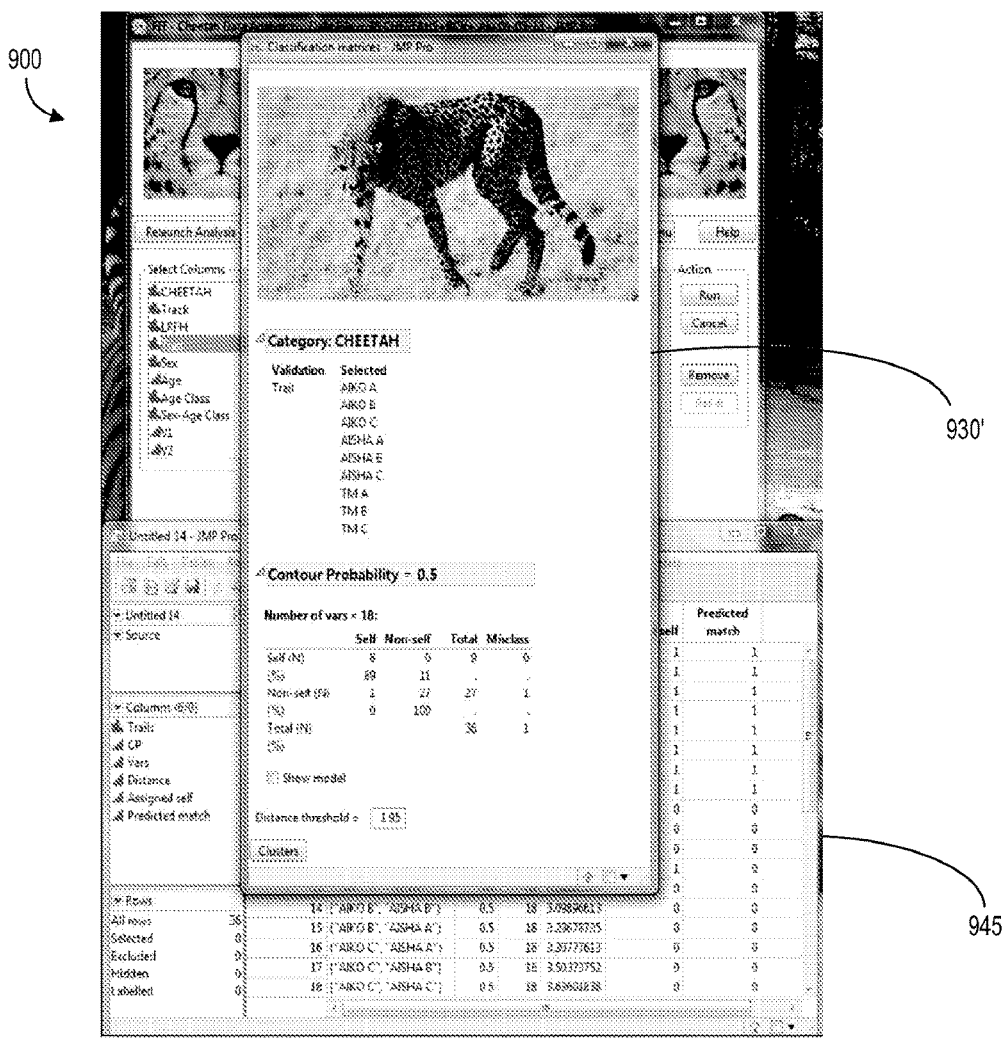
FIG. 9E depicts an example UI 900 of the object classification system, according to an example embodiment.
Figure 9F:
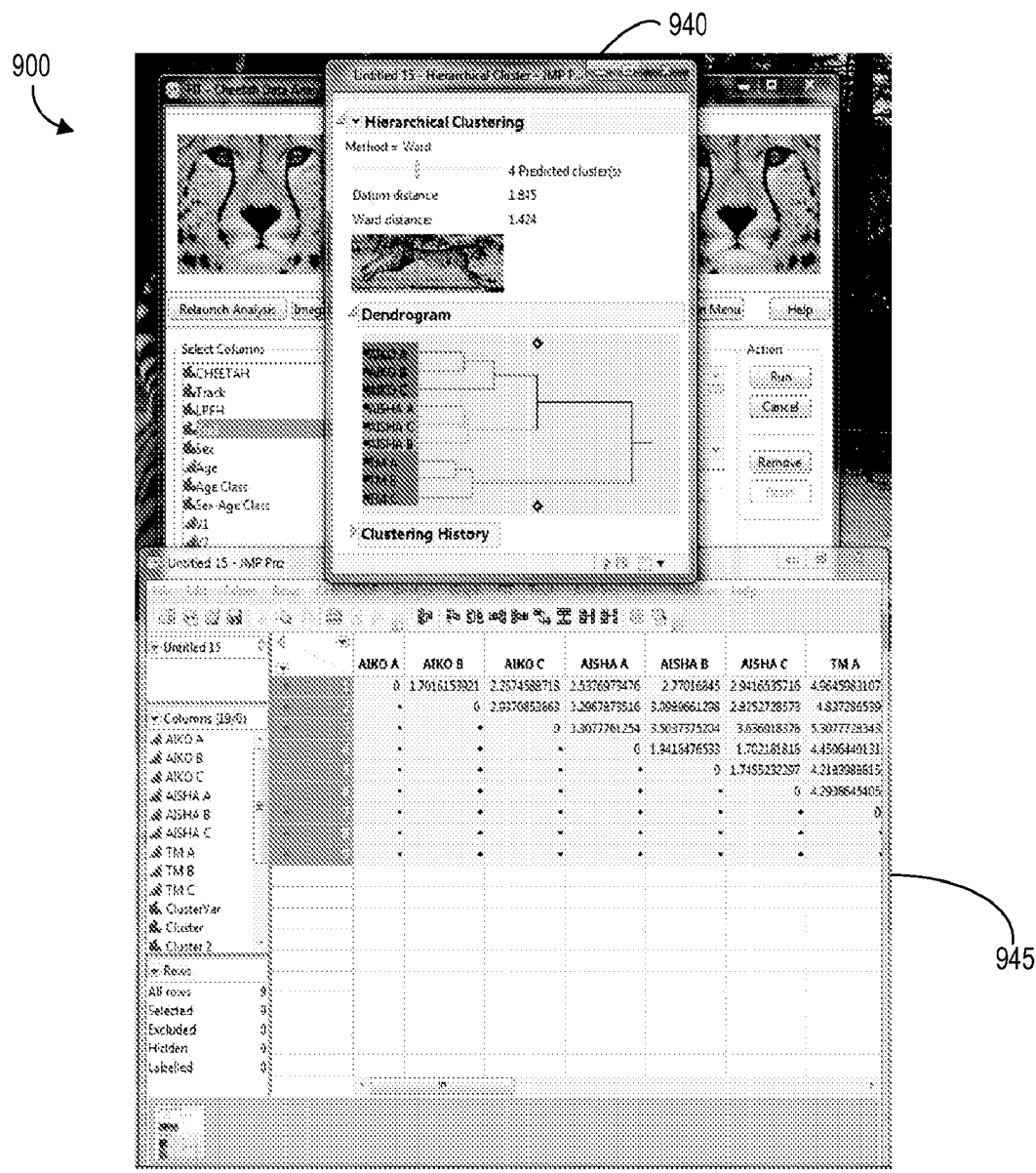
FIG. 9F depicts an example UI 900 of the object classification system, according to an example embodiment.
Figure 9G:
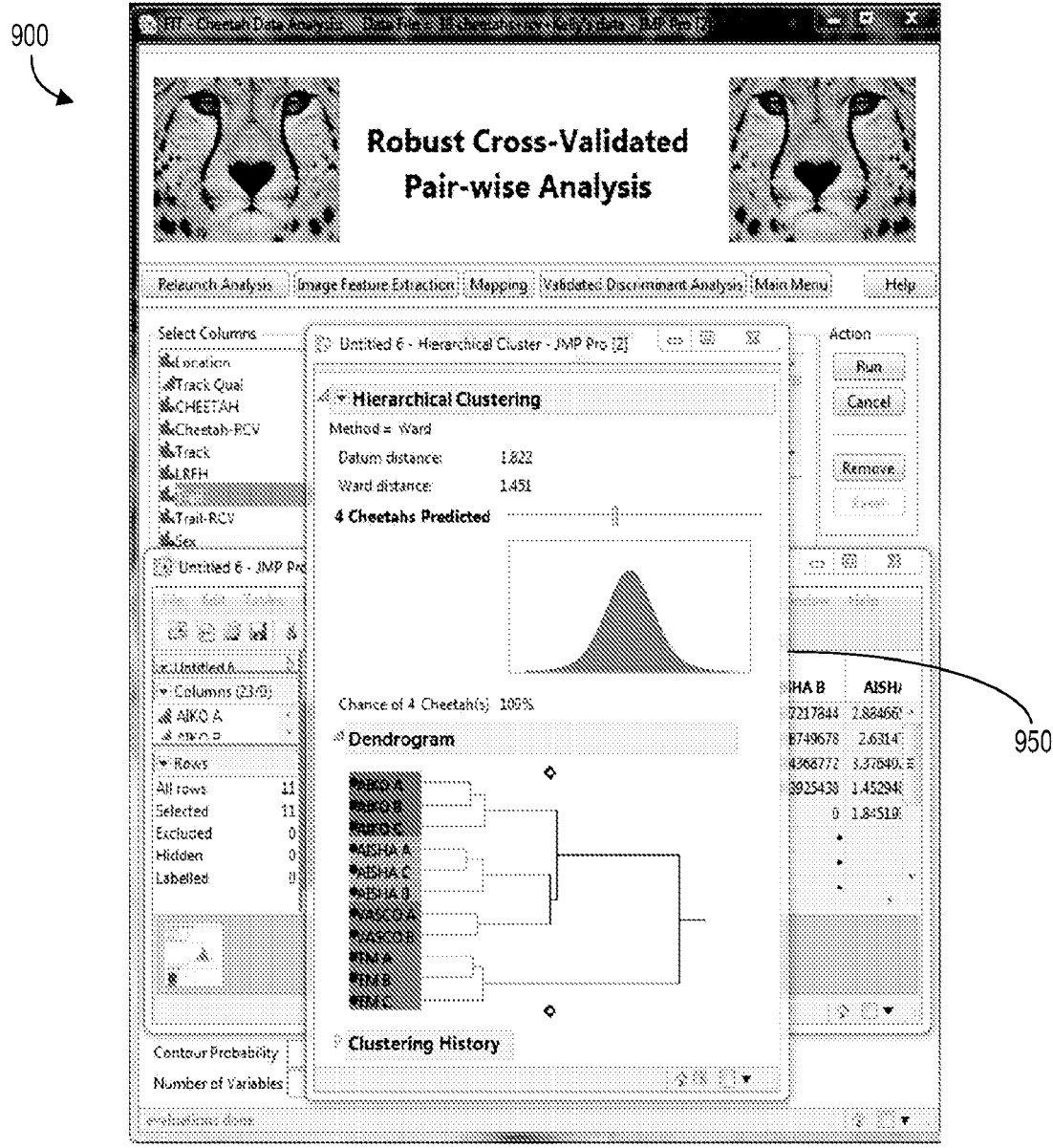
FIG. 9G depicts an example UI 900 of the object classification system, according to an example embodiment.
Figure 9H:
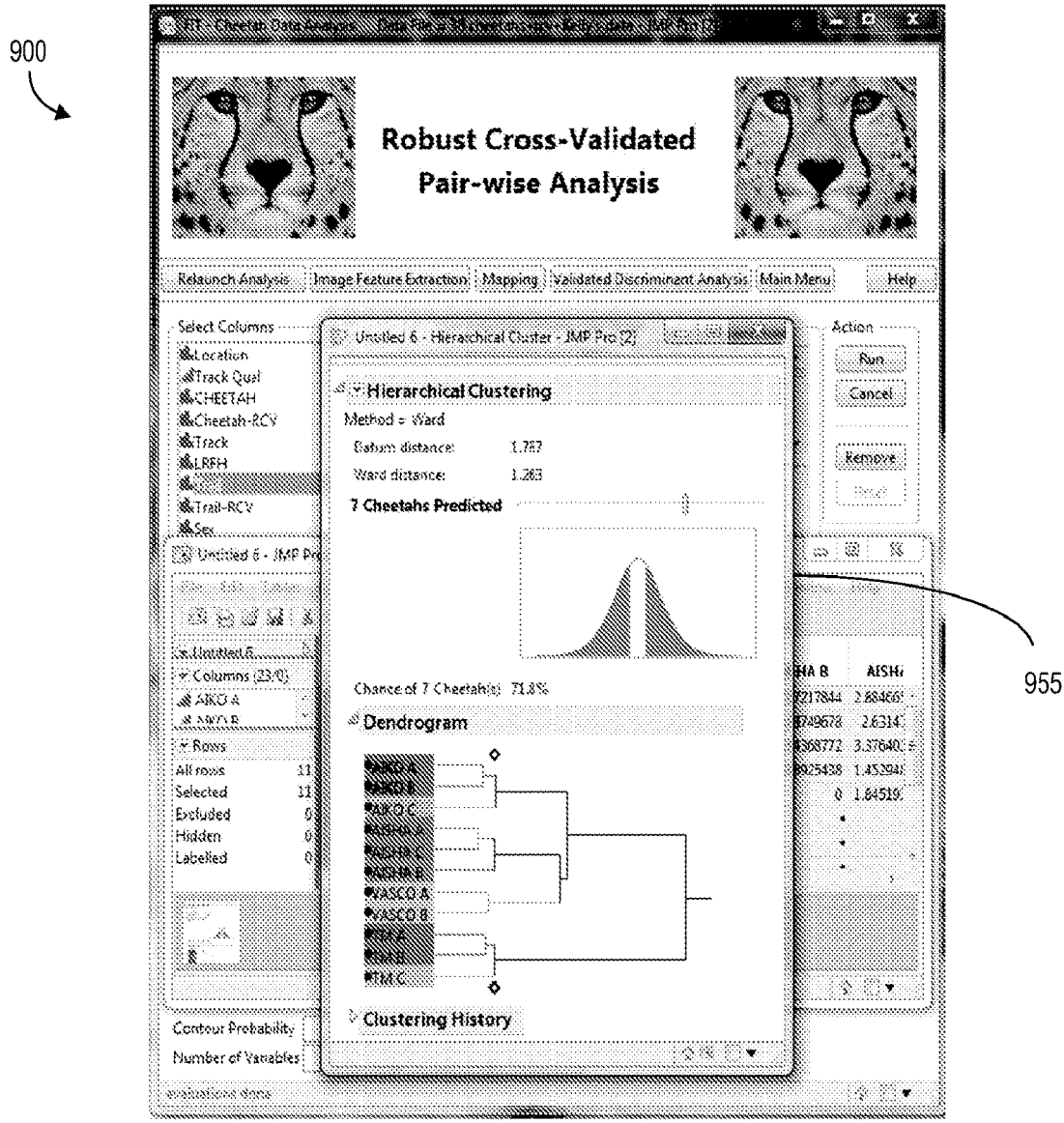
FIG. 9H depicts an example UI 900 of the object classification system, according to an example embodiment.

In one embodiment, as shown in FIG. 9D, the object classification system may display two output windows upon completion of the pair-wise analysis: 1) an output table 935 displaying the classification distance between each validation pair and the assigned self/non-self classification of each pair, and 2) a classification matrices window 930. The output table 935 may show contour probability in the form of a summarized self/non-self table. The assigned self/non-self table may represent how many, and what percentage of objects have been correctly classified. The assigned self/non-self table may be used to gauge the performance of a given algorithm, and therefore may be used in the process of developing an algorithm that produces the desired level of accuracy of results. FIG. 9E depicts an embodiment of an analysis user interface 900 showing an expanded classification matrices window 930', which may be a version of classification matrices window 930 that has been expanded to display more content. The expanded classification matrices window 930' may contain a "show model" check box, a "distance threshold" box, and a "Clusters" button. In various embodiments, selection of the "show model" check box of expanded classification matrices window 930' may cause the object classification system to display the variables used for each pair-wise comparison, and the "distance threshold" box may provide the distance between centroids. Selection of the "Clusters" button may cause the object classification system to generate a distances table and a cluster dendrogram, wherein the distances table may show the distances between any two trails, and the cluster dendrogram may be the final output for the chosen variables. The cluster dendrogram may represent an analytical visualization for individual classification. Generally, a cluster dendrogram positions each object in a particular place in the dendrogram relative to other groups. For example, a cluster dendrogram representing a group of data sets (derived from footprint images) relating to a group of cheetahs may show how many groups (cheetahs) are represented within the set of footprints, and how each footprint is related to its neighbors (i.e., how many cheetahs are in the population, and which footprints belong to which cheetah. FIG. 9F depicts exemplary embodiments of a distances table 945 and a cluster dendrogram 940 of the object classification system. In other embodiments, the object classification system may be used to estimate the likelihood that the number of individual objects in a group of objects is less than or greater to a predicted value. For example, if there are 20 sets of tracks being analyzed, the system may be used to determine what the likelihood is that the 20 sets of tracks are from more than 14 individual tigers. FIG. 9G depicts an embodiment of an analysis user interface 900 showing a results window 950 with a cluster dendrogram and a prediction window testing the probability that there are five cheetahs represented by the data. FIG. 9H depicts an embodiment of an analysis user interface 900 showing a results window 955 with a cluster dendrogram showing and a prediction window testing the probability that there are six cheetahs represented by the data. The distribution created by the object classification system to determine the probability of a given number of objects may be based on the actual distribution of the centroid values of each group from each other.

Object Identification and Classification

As discussed, the preceding process of pair-wise analysis may be repeated until the desired accuracy of classification is achieved by varying one or more inputs, such as but not limited to one or more of the X Model, Y column, contour probability, and validation inputs. Once the desired accuracy of classification is achieved, the resulting algorithm may be saved for future use in classifying unknown object images, according to one embodiment. In one embodiment, after the algorithm has been initialized, the pair-wise analysis described above may be repeated on a set of image from an unknown object. In various embodiments, a set of digital images of an unknown object may be received by the object classification system, and the system may perform the previously described pair-wise analysis and ultimately generate a cluster dendrogram. From the cluster dendrogram it may be determined whether the unknown object is of the same group of any of the other known objects. Separately from determining and individual classification using a pair-wise analysis, the object classification system may also classify one or more group criterion of an object using validated discriminant analysis. The validated discriminant analysis may be used to identify a group criterion of an unknown object before or after a pair-wise analysis may be used to generate an individual classification of the object.

Figure 10A:
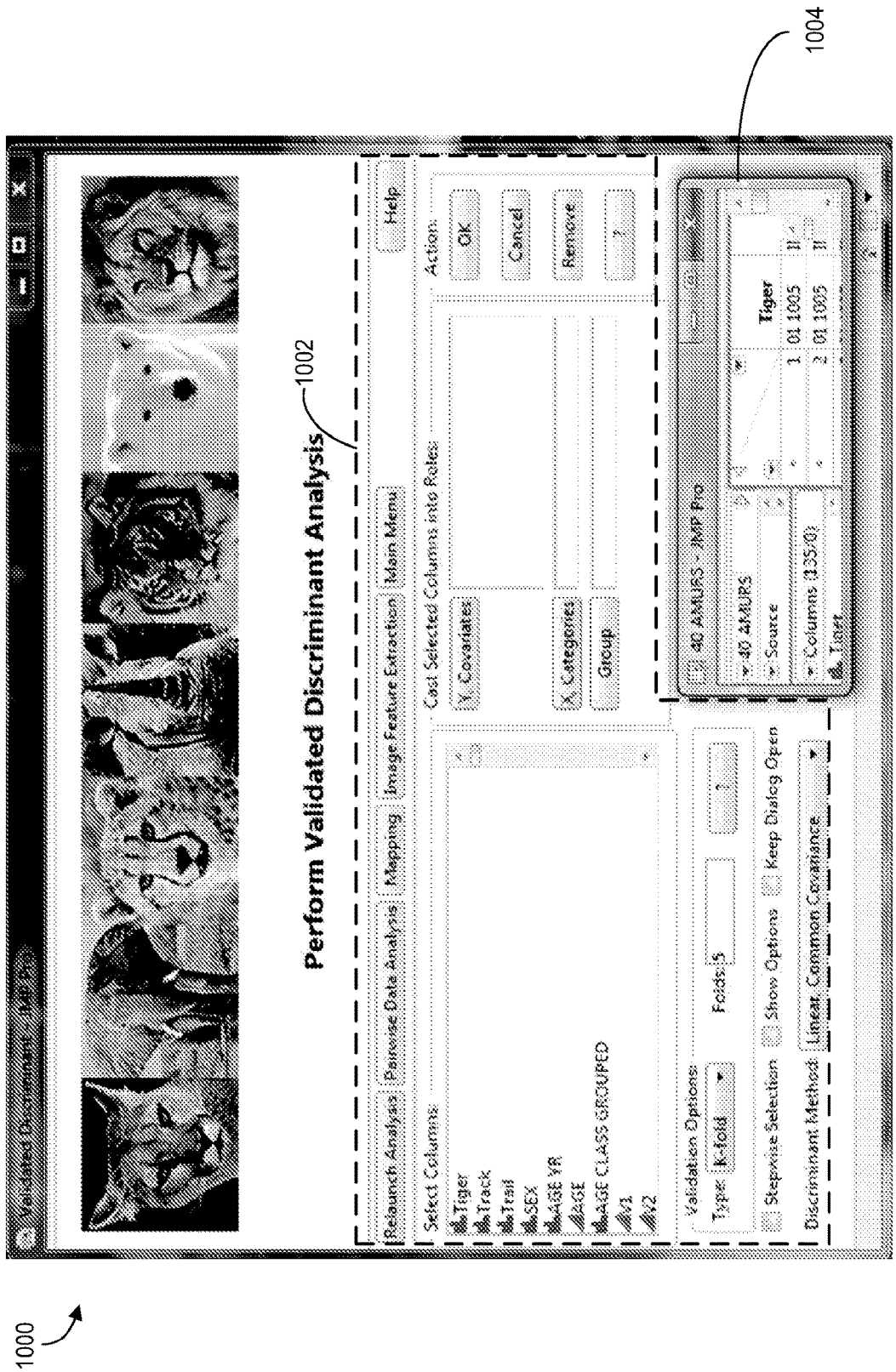
FIG. 10A depicts an example UI 1000 of the object classification system, according to an example embodiment.
Figure 10B:
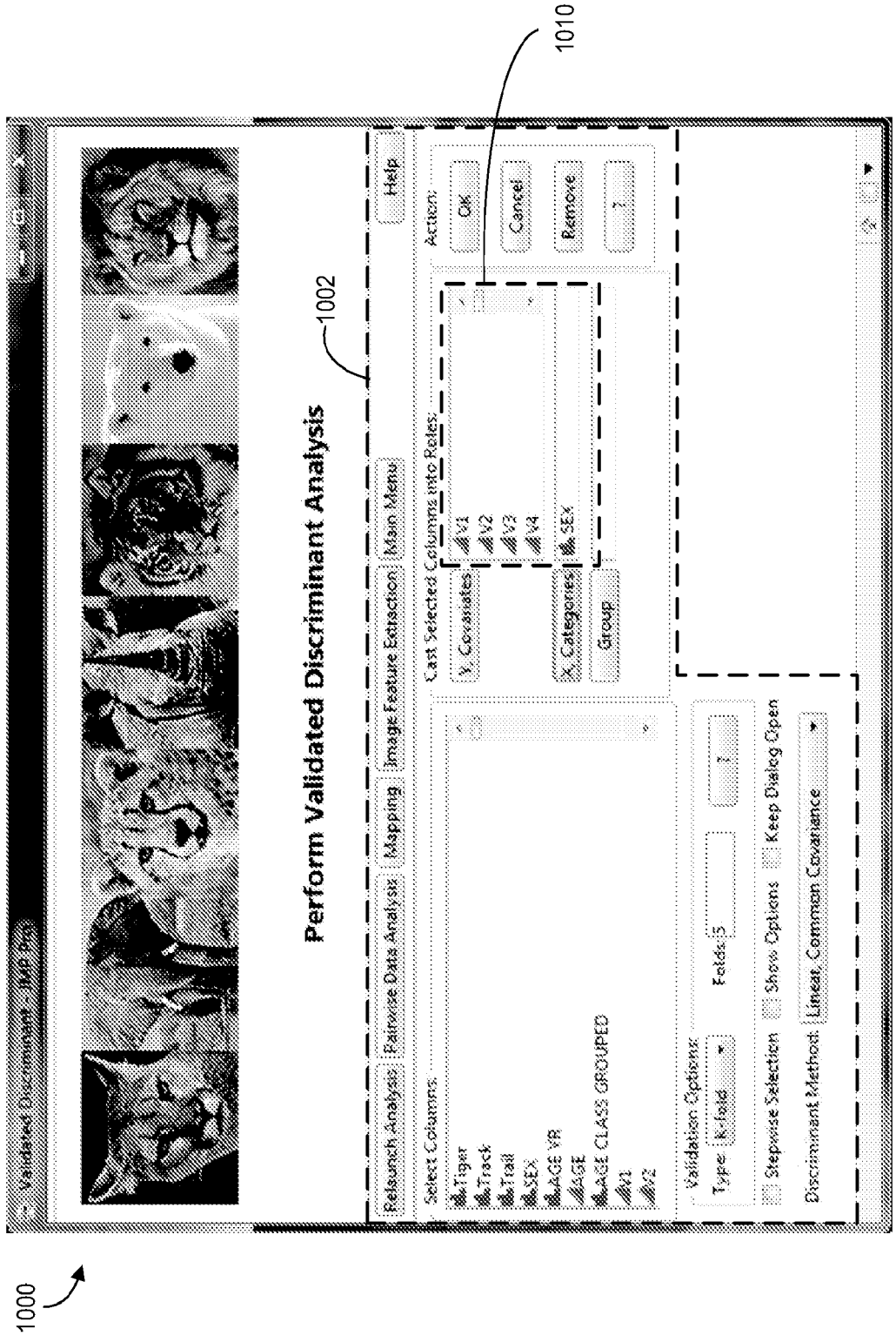
FIG. 10B depicts an example UI 1000 of the object classification system, according to an example embodiment.
Figure 10C:
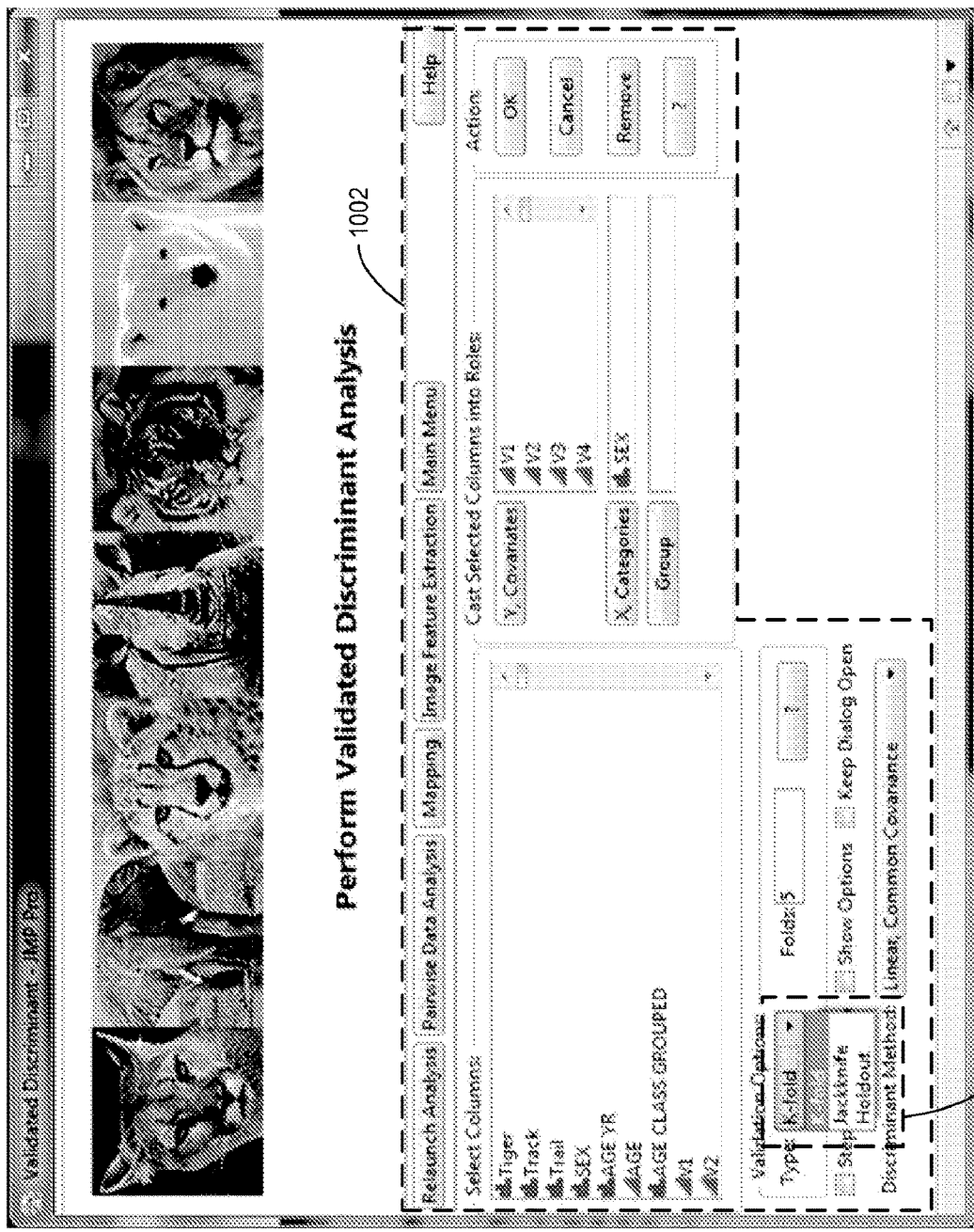
FIG. 10C depicts an example UI 1000 of the object classification system, according to an example embodiment.

FIG. 10A depicts an embodiment of a validated discriminant analysis user interface 1000 of the object classification system providing various user control elements 1002. In one embodiment, user control elements 1002 may control the parameters of the validated discriminant analysis to be performed by the system. In various embodiments, the system may utilize discriminant analysis to identify an unknown object from a set of digital images of the unknown object. In some embodiments, the system may use validated discriminate analysis to further identify or classify group attributes of the unknown object. For example, if the unknown object is an animal, validated discriminant analysis may be used to identify the sex, age-class or species of the animal. In various embodiments, validated discriminate analysis may be performed by the system in response to the selection of various inputs, including but not limited to, the designation of variables as covariates, a selection of an X-category by which to discriminate (for example, sex or age-class), selection of a validation type (e.g., K-fold, Jacknife, or Holdout), selection of the number of folds, and selection of stepwise selection of variables. In some embodiments, a further classification level (e.g., age-class within sex) may also be specified. FIG. 10B depicts an embodiment of a validated discriminant analysis user interface 1000 showing the "Y, Covariates" portion of inputs 1010 of the user control elements 1002 specified to be at least datasets V1, V2, V3 and V4 and the "X, Category" portion of inputs 1010 of user control elements 1002 specified to be "Sex." FIG. 10C depicts another embodiment of a validated discriminant analysis user interface 1000 wherein the "Validation Options Type" input 1020 of the user control elements 1002 is designated as "K-fold" and the "Folds" input of the user control elements 1002 is designated as 5. In various embodiments, the validated discriminant analysis may be performed by the system in response to the selection of an "Ok" button of the user control elements 1002.

Figure 11:
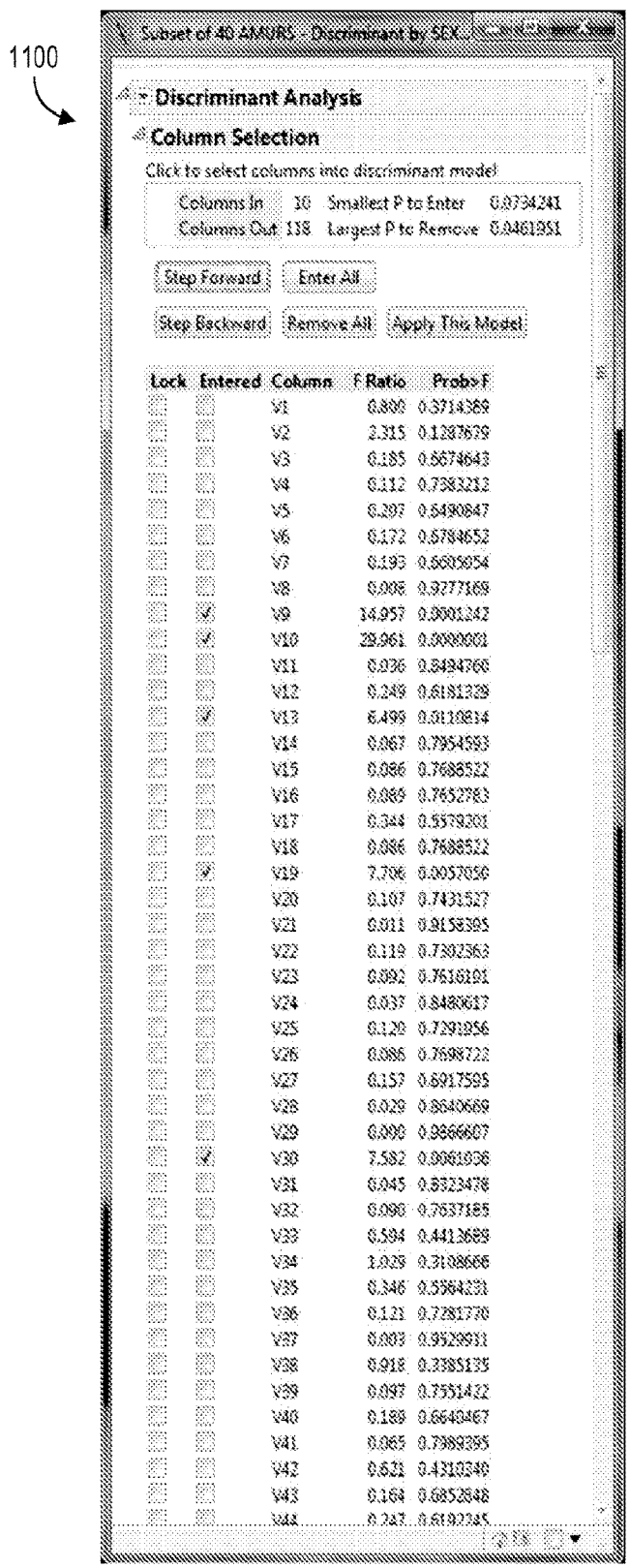
FIG. 11 depicts an example UI 1100 of the object classification system, according to an example embodiment.
Figure 12:
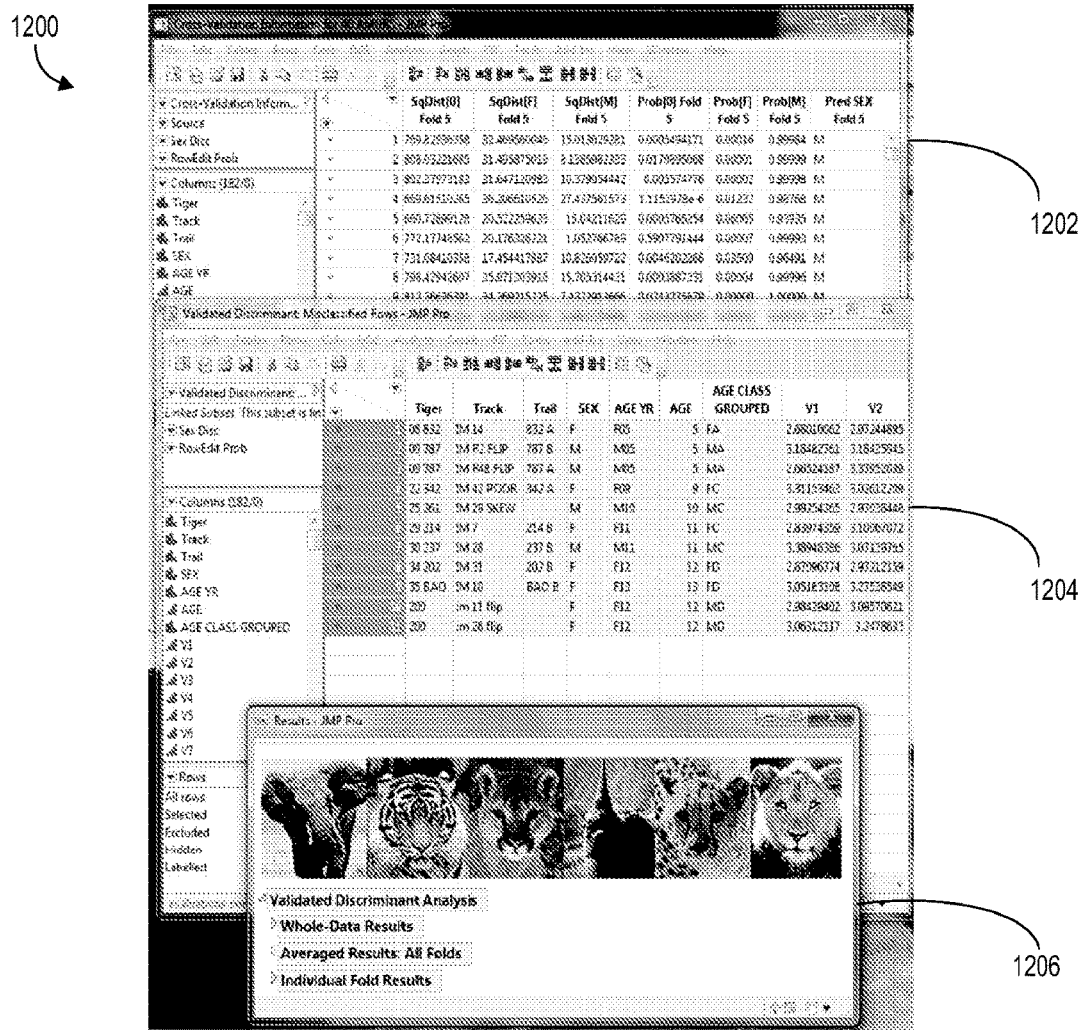
FIG. 12 depicts an example UI 1200 of the object classification system, according to an example embodiment.

In one embodiment, the object classification system may generate a variable selection table in response to performing the validated discriminant analysis. An exemplary variable selection table 1100 is depicted in FIG. 11. The variable selection table 1100 may enable a user to select a number of variables required depending on the F-ratio by selecting an input, such as a "Step Forward" button. For example, the variable with the highest F-ratio may be selected every time the "Step Forward" button is selected. After the first variable is selected the system may then select (from the remaining variables) the one with the next highest F-ratio, wherein each time a variable is selected it is excluded from the calculation for the next variable (and thus F-ratio orders may change at each selection step). In one embodiment, the system may apply the model specified by the variable selection table 1100 to generate various results. For example, as depicted in the embodiment in FIG. 12, the object classification system may generate a cross-validation window 1202, a validated discriminant misclassified rows window 1204 and a results window 1206 in response to applying the model of the variable selection table 1100. The cross-validation window 1202 may provide details on predicted values for the variables selected. The validated discriminant misclassified rows window 1204 may show the variables that were misclassified by the system, and the results window 1206 may provide whole-data results, averaged results (using folds) and individual fold results.

Figure 13:
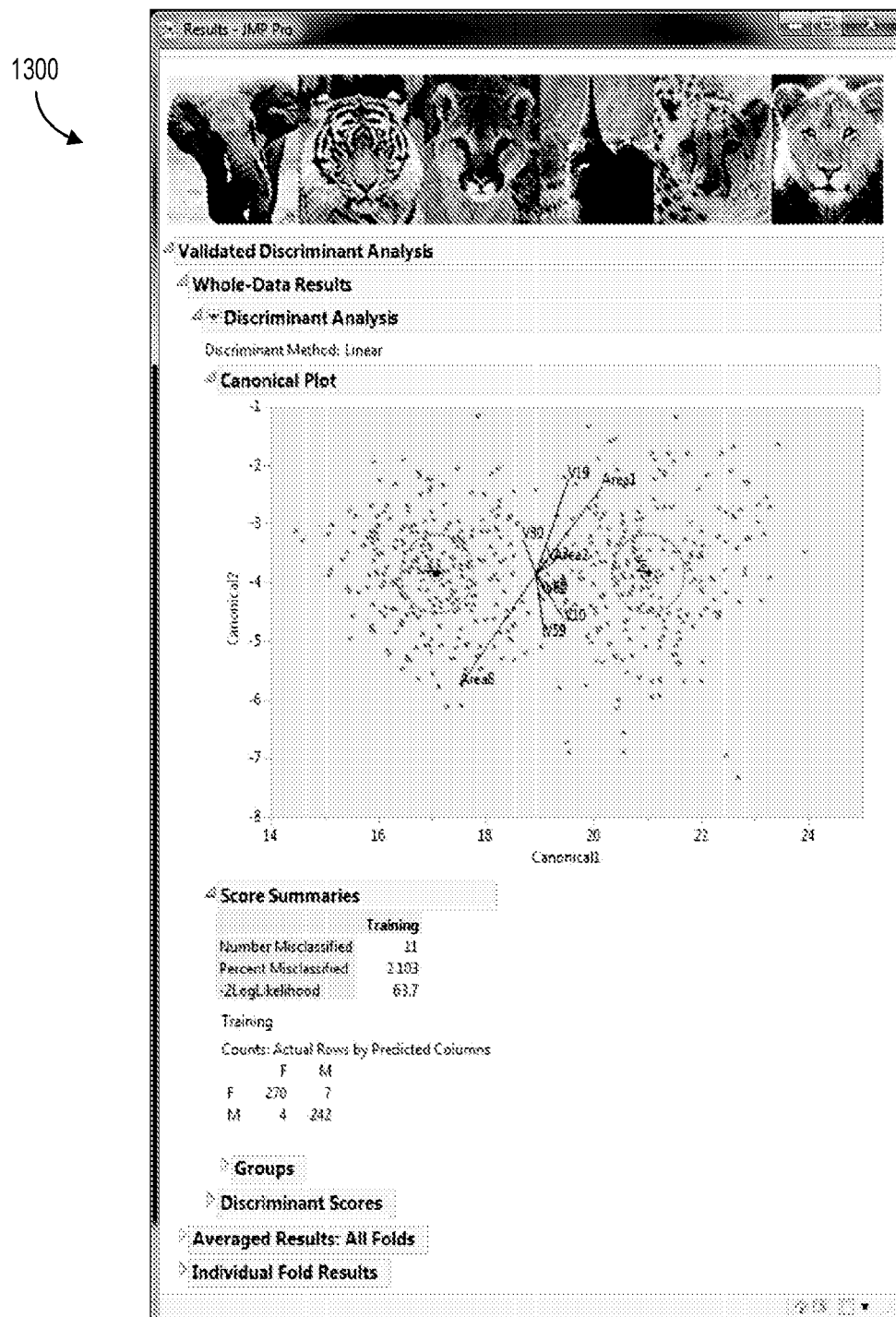
FIG. 13 depicts an example UI 1300 of the object classification system, according to an example embodiment.

In various embodiments, the object classification system may be enabled to further generate a whole-data results window. FIG. 13 depicts and exemplary embodiment of a whole-data results window 1300 of the system. The whole-data results window 1300 may depict the canonical variates that are produced from a validated discriminant analysis. For example, each point may represent a footprint, wherein red points represent female footprints and blue points represent male footprints. The lines in the plot may represent the selected variables. In the example in FIG. 13, it can be seen that the whole-data results show a clear separation of footprints by sex.

It will be understood that the various steps shown in FIGS. 1-13 are illustrative only, and that steps may be removed, other steps may be used, or the order of steps may be modified.

Certain embodiments of the disclosed technology are described above with reference to block and flow diagrams of systems and methods and/or computer program products according to example embodiments of the disclosed technology. It will be understood by those of skill in the art that one or more blocks of the block diagrams and flow diagrams, and combinations of blocks in the block diagrams and flow diagrams, respectively, may be implemented by computer-executable program instructions. Likewise, some blocks of the block diagrams and flow diagrams may not necessarily need to be performed in the order presented, or may not necessarily need to be performed at all, according to some embodiments of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that may direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood by those of skill in the art that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A method of classifying an object comprising:
   receiving a set of images of an indication of the object;
   extracting, from each image in the set of images of the indication of the object, and independently from other images in the set of images of the indication of the object, image data, wherein extracting image data comprises:
   providing, based on a user input, a plurality of landmark points on an image of the set of images of the indication of the object;
   based on the plurality of landmark points, automatically providing a plurality of derived points on the image;
   generating object data, wherein object data comprises at least one of an area, an angle or a distance between landmark points and/or derived points; and
   outputting the object data;
   comparing the image data to a set of comparison data, wherein the set of comparison data comprises a plurality of data sets, wherein each of the plurality of data sets is associated with a comparative object;
   determining a classification of the object based on the comparison; and
   outputting, for display, output data representative of the determined classification of the object.

2. The method of claim 1, wherein extracting image data further comprises adjusting the resolution and orientation of the image to substantially match the resolution and orientation of a sample object image.

3. The method of claim 2, wherein the sample object image comprises a number of sample landmark points, and wherein each landmark point provided on the image corresponds to a corresponding sample landmark point on the sample object image.

4. The method of claim 1, wherein a position of each derived point is determined by the positions of a number of landmark points.

5. The method of claim 1, wherein extracting image data further comprises providing two scale points on the image, positioned with respect to a measuring reference depicted in the image such that the positions of the two scale points correspond to a reference distance of the measuring reference.

6. The method of claim 1, wherein comparing the image data set to a set of comparison data comprises:
   generating, through discriminant analysis of the image data and the set of comparison data, an image set of canonical variates corresponding to the image data, a plurality of comparison sets of canonical variates, wherein each of the plurality of comparison sets of canonical variates corresponds to a comparative object, and an RCV set of canonical variates corresponding to a cumulative set of image data and comparison data;
   generating a first centroid value corresponding to the image set of canonical variates, a plurality of comparison centroid values, wherein each of the plurality of comparison centroid values corresponds to a comparison set of canonical variates of the plurality of comparison sets of canonical variates, and an RCV centroid value corresponding to the RCV set of canonical variates;
   plotting, in two-dimensional space, the first set of canonical variates as a first canonical centroid plot represented by a first ellipse having a center point at the first centroid value, one of the plurality of comparison sets of canonical variates as a second canonical centroid plot represented by a second ellipse having a center point at one of the plurality of comparison centroid values, and the RCV set of canonical variates as an RCV canonical centroid plot, represented by a third ellipse having a center point at the RCV centroid value; and
   determining whether the first ellipse overlaps the second ellipse.

7. The method of claim 6, wherein determining a classification of the object comprises:
   classifying the object as having the same individual identity as a comparative object in response to determining that the first ellipse overlaps the second ellipse.

8. The method of claim 7 wherein the output data representative of the determined classification of the object comprises an indication that the object has the same individual identity as the comparative object.

9. The method of claim 6, wherein comparing the image data set to a set of comparison data further comprises:
   determining a plurality of distance values wherein a distance value comprises the distance between the first centroid value and a comparison centroid value of the plurality of comparison centroid values, the first centroid value and the RCV centroid value, a comparison centroid value of the plurality of comparison centroid values and the RCV centroid value, or a first comparison centroid value of the plurality of comparison centroid values and a second comparison centroid value of the plurality of comparison centroid values;
   applying a clustering technique to the plurality of distance values; and
   generating, responsive to applying the clustering technique, a cluster dendrogram.

10. The method of claim 9, wherein the clustering technique comprises Ward's clustering technique.

11. The method of claim 9, wherein the output data representative of the determined classification of the object comprises a cluster dendrogram.

12. The method of claim 1, wherein comparing the image data set to a set of comparison data comprises:
    performing a validated discriminant analysis of the image data, comprising:
    identifying a plurality of sets of known object data, wherein each of the plurality of sets of known object data comprises one of the plurality of sets of data which comprise the comparison data;
    receiving a selection of variables; and
    responsive to receiving the selection of variables, generating, through discriminant analysis, a canonical plot of the image data and the plurality of sets of known object data, wherein the image data is located at a location in the canonical plot;
    identifying a region of the canonical plot that corresponds to a classification of a group criterion; and
    determining the group criterion classification of the object based on the location of the extracted data in the canonical plot relative to the identified region.

13. The method of claim 12, wherein receiving a selection of variables comprises:
    designating the plurality of sets of known object data as a Y variables in a validated discriminant analysis;
    receiving a selection of a group criterion as an X variable in a validated discriminant analysis; and receiving a selection of other validated discriminant analysis variables.

14. The method of claim 13, wherein other validated discriminant analysis variables comprise at least one of validation type, number of folds, and stepwise selection.

15. The method of claim 12, wherein thee group criterion comprises one of sex, age-class or species.

16. The method of claim 12, wherein the output data representative of the determined classification of the object comprises an indication of the group criterion classification of the object.

17. A method of classifying an object comprising:
receiving a set of images of an indication of the object;
extracting, from each image in the set of images of the indication of the object, image data;
comparing the image data to a set of comparison data, wherein the set of comparison data comprises a plurality of data sets, wherein each of the plurality of data sets is associated with a comparative object, wherein comparing the image data to a set of comparison data comprises:
generating, through discriminant analysis of the image data and the set of comparison data, an image set of canonical variates corresponding to the image data, a plurality of comparison sets of canonical variates, wherein each of the plurality of comparison sets of canonical variates corresponds to a comparative object, and an RCV set of canonical variates corresponding to a cumulative set of image data and comparison data;
generating a first centroid value corresponding to the image set of canonical variates, a plurality of comparison centroid values, wherein each of the plurality of comparison centroid values corresponds to a comparison set of canonical variates of the plurality of comparison sets of canonical variates, and an RCV centroid value corresponding to the RCV set of canonical variates;
plotting, in two-dimensional space, the first set of canonical variates as a first canonical centroid plot represented by a first ellipse having a center point at the first centroid value, one of the plurality of comparison sets of canonical variates as a second canonical centroid plot represented by a second ellipse having a center point at one of the plurality of comparison centroid values, and the RCV set of canonical variates as an RCV canonical centroid plot, represented by a third ellipse having a center point at the RCV centroid value; and
determining whether the first ellipse overlaps the second ellipse;
determining a classification of the object based on the comparison; and
outputting, for display, output data representative of the determined classification of the object.

18. The method of claim 17, wherein comparing the image data set to a set of comparison data further comprises:
determining a plurality of distance values wherein a distance value comprises the distance between the first centroid value and a comparison centroid value of the plurality of comparison centroid values, the first centroid value and the RCV centroid value, a comparison centroid value of the plurality of comparison centroid values and the RCV centroid value, or a first comparison centroid value of the plurality of comparison centroid values and a second comparison centroid value of the plurality of comparison centroid values;
applying a clustering technique to the plurality of distance values; and
generating, responsive to applying the clustering technique, a cluster dendrogram.

19. The method of claim 17, wherein the output data representative of the determined classification of the object comprises a cluster dendrogram.

* * * * *